(12) United States Patent
Song et al.

(10) Patent No.: US 12,079,493 B2
(45) Date of Patent: Sep. 3, 2024

(54) STORAGE DEVICES AND METHODS OF OPERATING STORAGE DEVICES

(71) Applicant: SAMSUNG ELECTRONICS CO., LTD., Suwon-si (KR)

(72) Inventors: Wonjong Song, Seoul (KR); Soonyoung Kim, Hwaseong-si (KR); Taeyoung Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 183 days.

(21) Appl. No.: 17/850,723

(22) Filed: Jun. 27, 2022

(65) Prior Publication Data

US 2023/0152991 A1 May 18, 2023

(30) Foreign Application Priority Data

Nov. 17, 2021 (KR) .......................... 10-2021-0158182
Jan. 13, 2022 (KR) .......................... 10-2022-0005071

(51) Int. Cl.
*G06F 3/06* (2006.01)

(52) U.S. Cl.
CPC .......... *G06F 3/0626* (2013.01); *G06F 3/0656* (2013.01); *G06F 3/0679* (2013.01)

(58) Field of Classification Search
CPC .... G06F 3/0626; G06F 3/0656; G06F 3/0679; G06F 3/068; G06F 3/0659; G06F 3/0608; G06F 3/0647; G06F 3/0658
See application file for complete search history.

(56) References Cited

U.S. PATENT DOCUMENTS

| | | | |
|---|---|---|---|
| 8,397,023 B2 | 3/2013 | Baderdinni et al. | |
| 9,092,337 B2 | 7/2015 | Nellans et al. | |
| 9,395,921 B2 | 7/2016 | Lu | |
| 9,563,382 B2 | 2/2017 | Hahn et al. | |
| 9,672,148 B1 | 6/2017 | Michaud et al. | |
| 9,710,167 B2 | 7/2017 | Liu et al. | |
| 10,048,899 B2 | 8/2018 | Hwang et al. | |
| 10,275,378 B2 | 4/2019 | Benisty | |
| 10,459,844 B2 | 10/2019 | Benisty et al. | |
| 10,824,335 B2 | 11/2020 | Rostoker et al. | |
| 10,866,737 B2 | 12/2020 | Ramalingam et al. | |
| 2006/0090016 A1 | 4/2006 | Edirisooriya | |
| 2020/0081848 A1* | 3/2020 | Bae | G06F 12/0862 |
| 2021/0255977 A1* | 8/2021 | Kiyota | G06F 12/0868 |
| 2021/0382652 A1* | 12/2021 | Sharma | G06F 3/0613 |
| 2022/0238170 A1* | 7/2022 | Kang | G11C 16/08 |

* cited by examiner

*Primary Examiner* — Francisco A Grullon
(74) *Attorney, Agent, or Firm* — Fish & Richardson P.C.

(57) ABSTRACT

A storage device includes a nonvolatile memory device and a storage controller. The nonvolatile memory device includes a first memory region having a first write speed and a second memory region having a second write speed different from the first write speed. The storage controller includes an internal buffer and stores data from an external host in the first memory region by priority in a first mode. The storage controller controls a data migration operation by performing a read operation-transfer operation to read a second data that is pre-stored in the first memory region by a first unit and to transfer the first unit of data to a data input/output (I/O) circuit of the nonvolatile memory device a plurality of times and by storing the second data transferred to the data I/O circuit in the second memory region.

20 Claims, 25 Drawing Sheets

FIG. 2

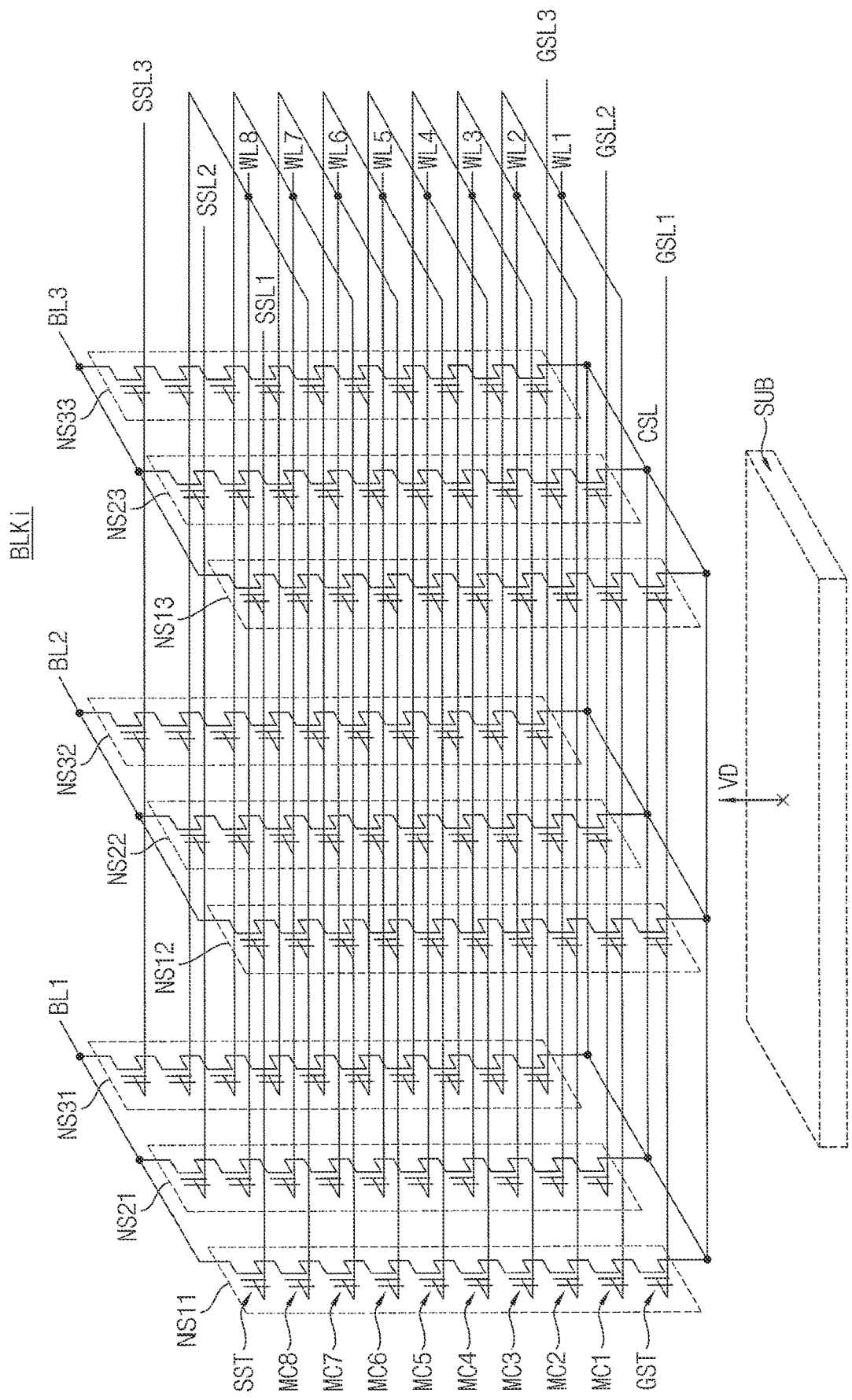

[LU DEDICATED BUFFER TYPE]

STORAGE DEVICES AND METHODS OF OPERATING STORAGE DEVICES

CROSS-REFERENCE TO RELATED APPLICATIONS

This US application claims the benefit of priority under 35 USC § 119 to Korean Patent Application No. 10-2021-0158182, filed on Nov. 17, 2021 and to Korean Patent Application No. 10-2022-0005071, filed on Jan. 13, 2022, in the Korean Intellectual Property Office, the disclosures of each of which are incorporated by reference in their entirety herein.

BACKGROUND

1. Technical Field

Exemplary embodiments generally relate to semiconductor integrated circuits, and more particularly to storage devices and methods of operating storage devices.

2. Discussion of the Related Art

Semiconductor memory devices are classified into a volatile memory and a nonvolatile memory. Data stored in the volatile memory may be lost after power-off. Data stored in the nonvolatile memory are retained even after power-off. A flash memory device is an example of a nonvolatile memory device. A flash memory device has a mass storage capability, relatively high noise immunity, and a low power operation. Therefore, flash memory devices are employed in various fields. For example, a mobile system such as a smart-phone, or a tablet personal computer (PC) may employ flash memory as a storage medium.

In mobile devices including a nonvolatile memory device and a storage controller, attempts are being explored to reduce a size of the storage controller.

SUMMARY OF THE INVENTION

Some exemplary embodiments may provide a storage device capable of reducing a size of a storage controller.

Some exemplary embodiments may provide a method of operating a storage device, capable of reducing a size of a storage controller.

According to some exemplary embodiments, a storage device includes a nonvolatile memory device and a storage controller. The nonvolatile memory device includes a first memory region having a first write speed and a second memory region having a second write speed different from the first write speed. The storage controller includes an internal buffer and stores data from an external host in the first memory region by priority in a first mode. The storage controller controls a data migration operation by performing a read operation-transfer operation to read a second data that is pre-stored in the first memory region by a first unit and to transfer the first unit of data to a data input/output (I/O) circuit of the nonvolatile memory device a plurality of times and by storing the second data transferred to the data I/O circuit in the second memory region.

According to some exemplary embodiments, there is provided a method of operating a storage device that includes a first memory region having a first write speed and a second memory region having a second write speed different from the first write speed and a storage controller that includes an internal buffer and controls the nonvolatile memory device. According to the method, first data is received, by the storage controller, from an external host, the first data is programmed, by the storage controller, in the first memory region in a first mode, read operation-transfer operation to read a second data that is pre-stored in the first memory region by a first unit and to transfer the first unit of data to a data input/output (I/O) circuit of the nonvolatile memory device is performed by the storage controller a plurality of times and the second data transferred to the data I/O circuit is programmed, by the nonvolatile memory device, in the second memory region.

According to some exemplary embodiments, a storage device includes a nonvolatile memory device and a storage controller. The nonvolatile memory device includes a first memory region having a first write speed and a second memory region having a second write speed different from the first write speed. The storage controller includes an internal buffer and stores data from an external host in the first memory region by priority in a first mode. The storage controller controls a data migration operation by performing a read operation-transfer operation to read a second data that is pre-stored in the first memory region by a first unit and to transfer the first unit of data to a data input/output (I/O) circuit of the nonvolatile memory device a plurality of times and by storing the second data transferred to the data I/O circuit in the second memory region. The storage controller further includes a processor, a program/migration manager and an error correction code (ECC) engine. The processor determines a write mode associated with the first data as one of the first mode and a second mode to store the first data in the second memory region based on a write request associated with the first data. The program/migration manager controls a program operation and the data migration operation under control of the processor. The ECC engine corrects an error in the first unit of data by performing an ECC decoding operation on the first unit of data.

Accordingly, in the storage device and the method of operating a storage device according to exemplary embodiments, when the storage controller is to program a first data in a first memory region having a higher write speed, the storage controller performs a data migration operation to move sequentially a second data that is pre-stored in the first memory region to an internal buffer of the storage controller and to program the second data in a second memory region having a slower write speed. Therefore, it is possible that data capacity of the internal buffer is smaller than data storage capacity of the first memory region and thus the size of the storage controller may be reduced by reducing a size of the internal buffer.

BRIEF DESCRIPTION OF THE DRAWINGS

Illustrative, non-limiting exemplary embodiments will be more clearly understood from the following detailed description in conjunction with the accompanying drawings.

FIG. 7A is a circuit diagram illustrating one of the memory blocks of FIG. 6.

DETAILED DESCRIPTION OF THE PREFERRED EMBODIMENTS

Various exemplary embodiments will be described more fully hereinafter with reference to the accompanying drawings, in which some exemplary embodiments are shown.

Figure 1:
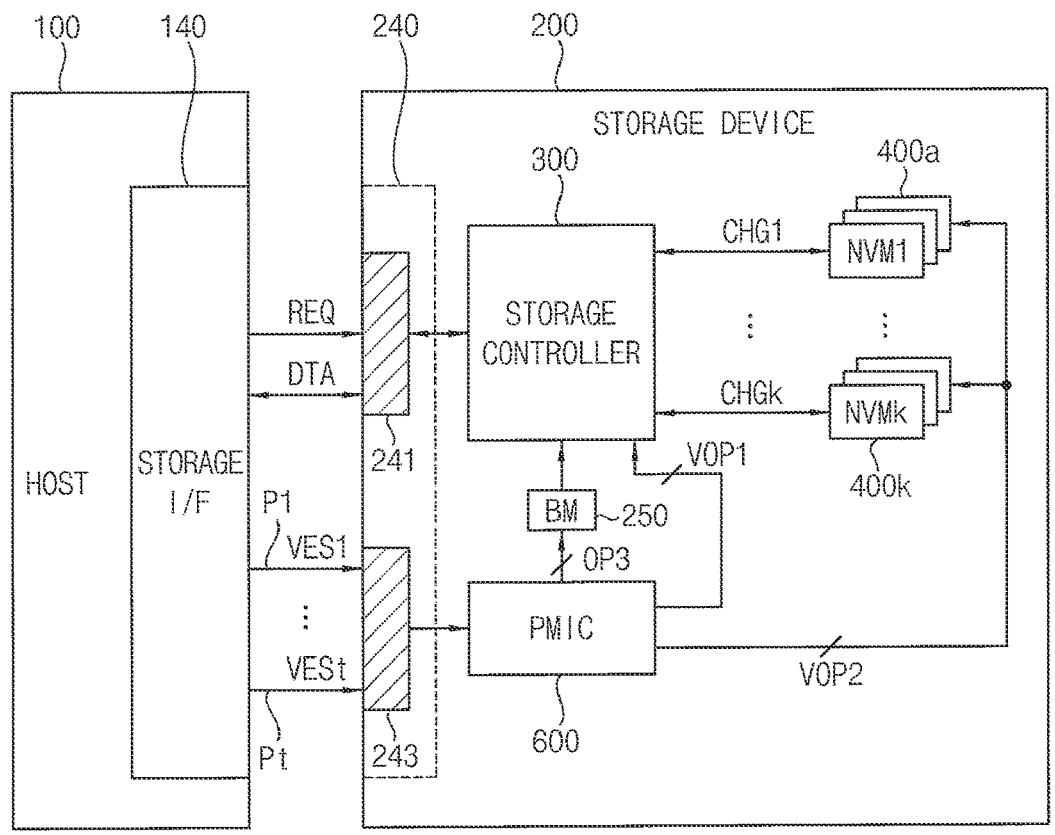
FIG. 1 is a block diagram illustrating a storage system according to exemplary embodiments.

FIG. 1 is a block diagram illustrating a storage system according to exemplary embodiments.

Referring to FIG. 1, a storage system 50 may include a host 100 and a storage device 200. The host 100 may include a storage interface (I/F) 140.

The storage device 200 may be any kind of storage device capable of storing data.

The storage device 200 may include a storage controller 300, a plurality of nonvolatile memory devices 400a to 400k (where k is an integer greater than two), a power management integrated circuit (PMIC) 600 and a host interface 240. The host interface 240 may include a signal connector 241 and a power connector 243. The storage device 200 may further include a buffer memory BM 250.

The plurality of nonvolatile memory devices 400a to 400k may be used as a storage medium of the storage device 200. In some exemplary embodiments, each of the plurality of nonvolatile memory devices 400a to 400k may include a flash memory or a vertical NAND memory device. The storage controller 300 may be coupled to the plurality of nonvolatile memory devices 400a to 400k through a plurality of channels CHG1 to CHGk, respectively.

The storage controller 300 may be configured to receive a request REQ from the host 100 and communicate data DTA with the host 100 through the signal connector 241. The storage controller 300 may write the data DTA to the plurality of nonvolatile memory devices 400a to 400k or read the data DTA from plurality of nonvolatile memory devices 400a to 400k based on the request REQ.

The storage controller 300 may communicate the data DTA with the host 100 using the buffer memory 250 as an input/output buffer. In some exemplary embodiments, the buffer memory 250 may include a dynamic random access memory (DRAM).

The PMIC 600 may be configured to receive a plurality of power supply voltages (i.e., external supply voltages) VES1 to VESt from the host 100 through the power connector 243. For example, the power connector 243 may include a plurality of power lines P1 to Pt, and the adaptive power supply circuit 500 may be configured to receive the plurality of power supply voltages VES1 to VESt from the host 100 through the plurality of power lines P1 to Pt, respectively. Here, t represents a positive integer greater than one.

The PMIC 600 may generate at least one first operating voltage VOP1 used by the storage controller 300, at least one second operating voltage VOP2 used by the plurality of nonvolatile memory devices 400a to 400k, and at least one third operating voltage VOP3 used by the buffer memory 250 based on the plurality of power supply voltages VES1 to VESt.

For example, when the PMIC 600 receives all of the plurality of power supply voltages VES1 to VESt from the host 100, the PMIC 600 may generate the at least one first operating voltage VOP1, the at least one second operating voltage VOP2, and the at least one third operating voltage VOP3 using all of the plurality of power supply voltages VES1 to VESt. On the other hand, when the PMIC 600 receives less than all of the plurality of power supply voltages VES1 to VESt from the host 100, the PMIC 600 may generate the at least one first operating voltage VOP1, the at least one second operating voltage VOP2, and the at least one third operating voltage VOP3 using all of the remainder of the plurality of power supply voltages VES1 to VESt that is received from the host 100.

Figure 2:
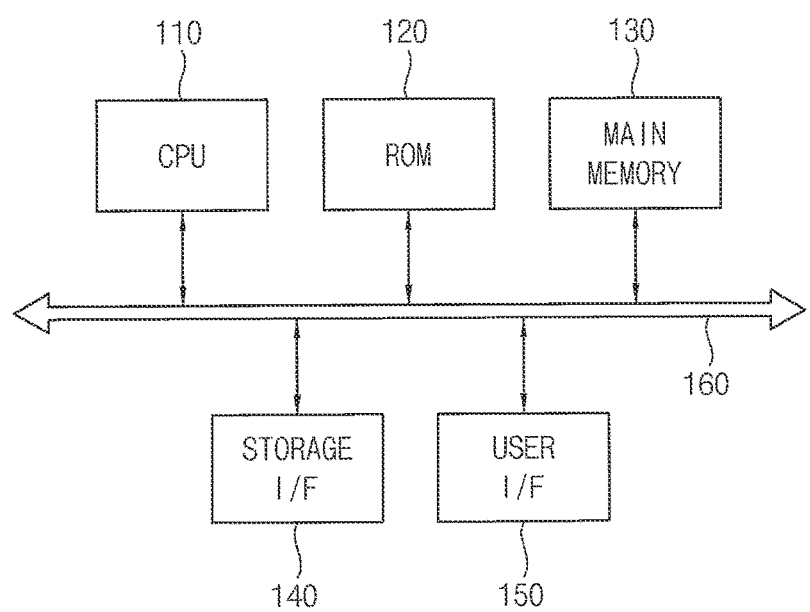
FIG. 2 is a block diagram illustrating the host in FIG. 1 according to exemplary embodiments.

FIG. 2 is a block diagram illustrating the host in FIG. 1 according to exemplary embodiments.

Referring to FIG. 2, the host 100 may include a central processing unit (CPU) 110, a read-only memory (ROM) 120, a main memory 130, a storage interface (I/F) 140, a user interface (I/F) 150 and a bus 160.

The bus 160 may refer to a transmission channel via which data is transmitted between the CPU 110, the ROM 120, the main memory 130, the storage interface 140 and the user interface 150 of the host 100. The ROM 120 may store various application programs. For example, application programs supporting storage protocols such as Advanced Technology Attachment (ATA), Small Computer System Interface (SCSI), embedded Multi Media Card (eMMC), and/or Universal flash storage (UFS) protocols are stored.

The main memory 130 may temporarily store data or programs. The user interface 150 may be a physical or virtual medium for exchanging information between a user and the host 100, a computer program, etc., and includes physical hardware and logical software. For example, the user interface 150 may include an input device for allowing the user to manipulate the host 100, and an output device for outputting a result of processing an input of the user.

The CPU 110 may control overall operations of the host 100. The CPU 110 may generate a command and the power supply voltages VES1 to VESt for storing data in the storage device 200 or a request (or a command) and the power supply voltages VES1 to VESt for reading data from the storage device 200 by using an application stored in the ROM 120, and transmit the request and the power supply voltages VES1 to VESt to the storage device 200 via the storage interface 140.

Figure 3:
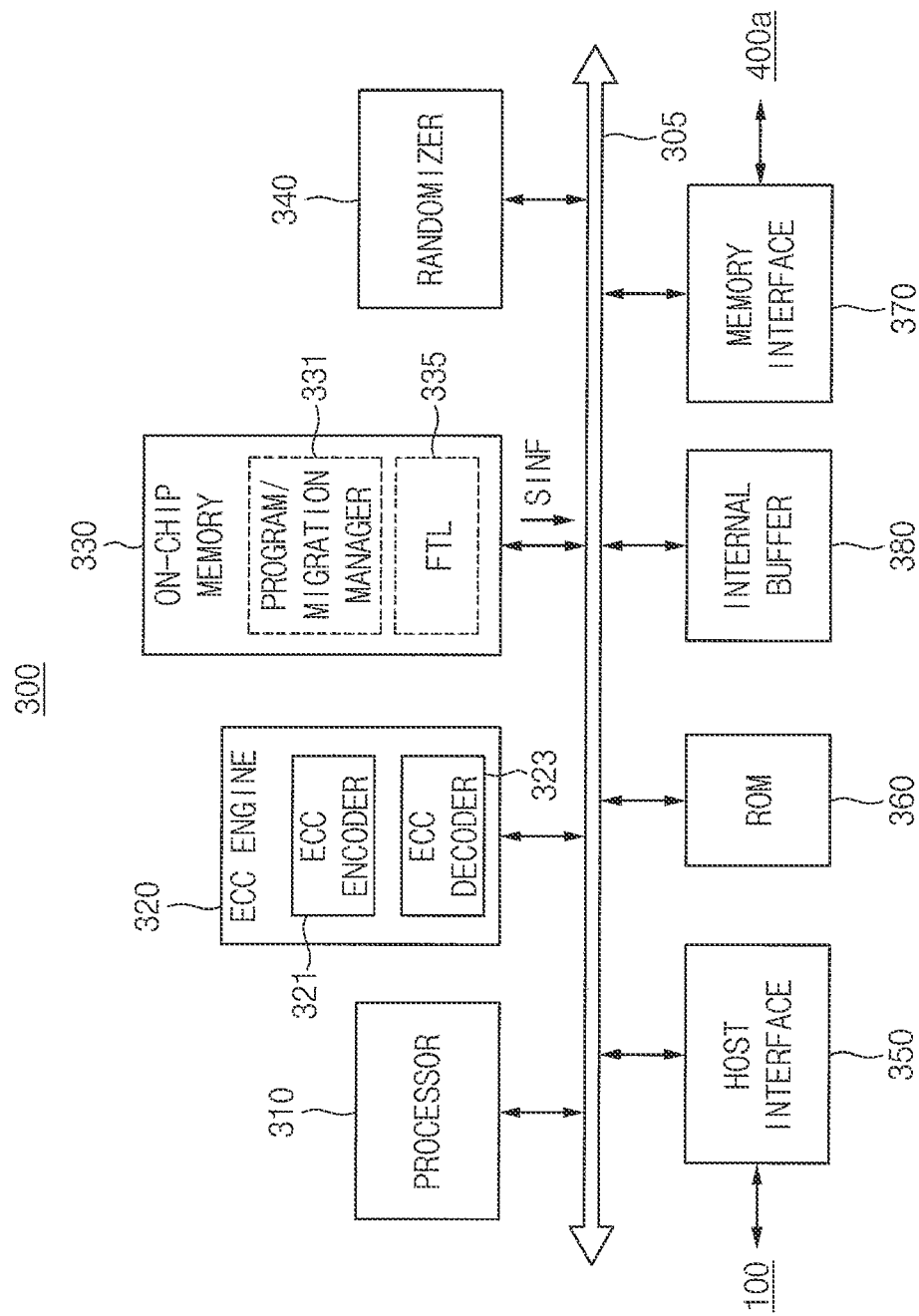
FIG. 3 is a block diagram illustrating an example of the storage controller in the storage device in FIG. 1 according to exemplary embodiments.

FIG. 3 is a block diagram illustrating an example of the storage controller in the storage device in FIG. 1 according to exemplary embodiments.

Referring to FIG. 3, the storage controller 300 may include a processor 310, an error correction code (ECC) engine 320, an on-chip memory 330, randomizer 340, a host interface 350, a ROM 360, an internal buffer 380, and a memory interface 370 which are connected via a bus 305.

The processor 310 controls an overall operation of the storage controller 300. The processor 310 may control the ECC engine 320, the on-chip memory 330, the randomizer 340, the host interface 350, the ROM 360, the internal buffer 380 and the memory interface 370.

The processor 310 may include one or more cores (e.g., a homogeneous multi-core or a heterogeneous multi-core). The processor 310 may be or include, for example, at least one of a central processing unit (CPU), an image signal processing unit (ISP), a digital signal processing unit (DSP), a graphics processing unit (GPU), a vision processing unit (VPU), and a neural processing unit (NPU). The processor 310 may execute various application programs (e.g., a flash translation layer (FTL) 335 and firmware) loaded onto the on-chip memory 330.

The on-chip memory 330 may store various application programs that are executable by the processor 310. The on-chip memory 330 may operate as a cache memory adjacent to the processor 310. The on-chip memory 330 may store a command, an address, and data to be processed by the processor 310 or may store a processing result of the processor 310. The on-chip memory 330 may be, for example, a storage medium or a working memory including a latch, a register, a static random access memory (SRAM), a dynamic random access memory (DRAM), a thyristor random access memory (TRAM), a tightly coupled memory (TCM), etc.

The processor 310 may execute the FTL 335 loaded onto the on-chip memory 330.

The FTL 335 may be loaded onto the on-chip memory 330 as firmware or a program stored in the one of the nonvolatile memory devices 400a to 400k. The FTL 335 may manage mapping between a logical address provided from the host 100 and a physical address of the nonvolatile memory devices 400a to 400k and may include an address mapping table manager managing and updating an address mapping table. The FTL 335 may further perform a garbage collection operation, a wear leveling operation, and the like, as well as the address mapping described above. The FTL 335 may be executed by the processor 310 for addressing one or more of the following aspects of the nonvolatile memory devices 400a to 400k: overwrite- or in-place write-impossible, a life time of a memory cell, a limited number of program-erase (PE) cycles, and an erase speed slower than a write speed.

The FTL 335 may store at least one of program/erase cycle information of a first memory region and a second memory region of each of the nonvolatile memory devices 400a to 400k, a number of free blocks in the first memory region and the second memory region and data retention time information of the first memory region and the second memory region and my provide the processor 310 with the stored information as a status information SINE The processor 310 may execute a program/migration manager 331 loaded onto the on-chip memory 330.

The program/migration manager 331 may control a program operation and a data migration operation, in response to a size of a valid region to store data of the first memory region of a target nonvolatile memory device from among the nonvolatile memory devices 400a to 400k being smaller than a size of the first data to be programmed, by performing read operation-transfer operation to read a second data that is pre-stored in the first memory region by a first unit corresponding to a size of the internal buffer 380 and to transfer the first unit of data to a data input/output (I/O) circuit of the target nonvolatile memory device a plurality of times and by storing the second data transferred to the data I/O circuit in a second memory region of the target nonvolatile memory device. In exemplary embodiments, the program/migration manager 331 may provide the first unit of data to the ECC engine 320, may receive the first unit of data in which an error is corrected from the ECC engine 320 and may provide the first unit of data in which an error is corrected to the data I/O circuit a plurality of times.

Memory cells of the nonvolatile memory devices 400a to 400k may have a physical characteristic in which a threshold voltage distribution varies due to causes, such as a program elapsed time, a temperature, program disturbance, read disturbance and etc. For example, data stored at the nonvolatile memory devices 400a to 400k may become erroneous due to the above listed causes.

The storage controller 300 may utilize a variety of error correction techniques to correct such errors. For example, the storage controller 300 may include the ECC engine 320. The ECC engine 320 may correct errors which occur in the data stored in the nonvolatile memory devices 400a to 400k. The ECC engine 320 may include an ECC encoder 321 and an ECC decoder 323. The ECC encoder 321 may perform an ECC encoding operation on data to be stored in the nonvolatile memory devices 400a to 400k. The ECC decoder 232 may perform an ECC decoding operation on data read from the nonvolatile memory devices 400a to 400k.

The ROM 360 may store a variety of information, needed for the storage controller 300 to operate, in firmware.

The randomizer 340 may randomize data to be stored in one of the nonvolatile memory devices 400a to 400k. For example, the randomizer 340 may randomize data to be stored in one of the nonvolatile memory devices 400a to 400k by a word-line.

Data randomizing may include processing data such that program states of memory cells connected to a word-line have the same ratio. For example, if memory cells connected to one word-line are triple level cells (TLC) each storing 3-bit data, each of the memory cells may have one of an erase state and first through seventh program states. In this case, the randomizer 340 may randomize data such that in memory cells connected to one word-line, the number of memory cells having the erase state, and each of the number of memory cells having the first through seventh program states may be substantially the same as one another. For example, memory cells in which randomized data is stored have program states of which the number is equal to one another.

The internal buffer 380 may have data storage capacity to store a first unit of data. The first unit may correspond to a page unit of a first memory region and a second memory region of each of the nonvolatile memory devices 400a to 400k. Because the internal buffer 380 has data storage capacity to store page unit of data, a occupied area of the storage controller 300 may be reduced by reducing a size of the internal buffer 300.

The storage controller 300 may communicate with the host 100 through the host interface 350. For example, the host interface 350 may include Universal Serial Bus (USB), Multimedia Card (MMC), embedded-MMC, peripheral component interconnection (PCI), PCI-express, Advanced Technology Attachment (ATA), Serial-ATA, Parallel-ATA, small computer small interface (SCSI), enhanced small disk interface (ESDI), Integrated Drive Electronics (IDE), Mobile Industry Processor Interface (MIPI), Nonvolatile memory express (NVMe), Universal Flash Storage (UFS), and etc.

The storage controller 300 may communicate with the nonvolatile memory devices 400a to 400k through the memory interface 370.

Figure 4A:
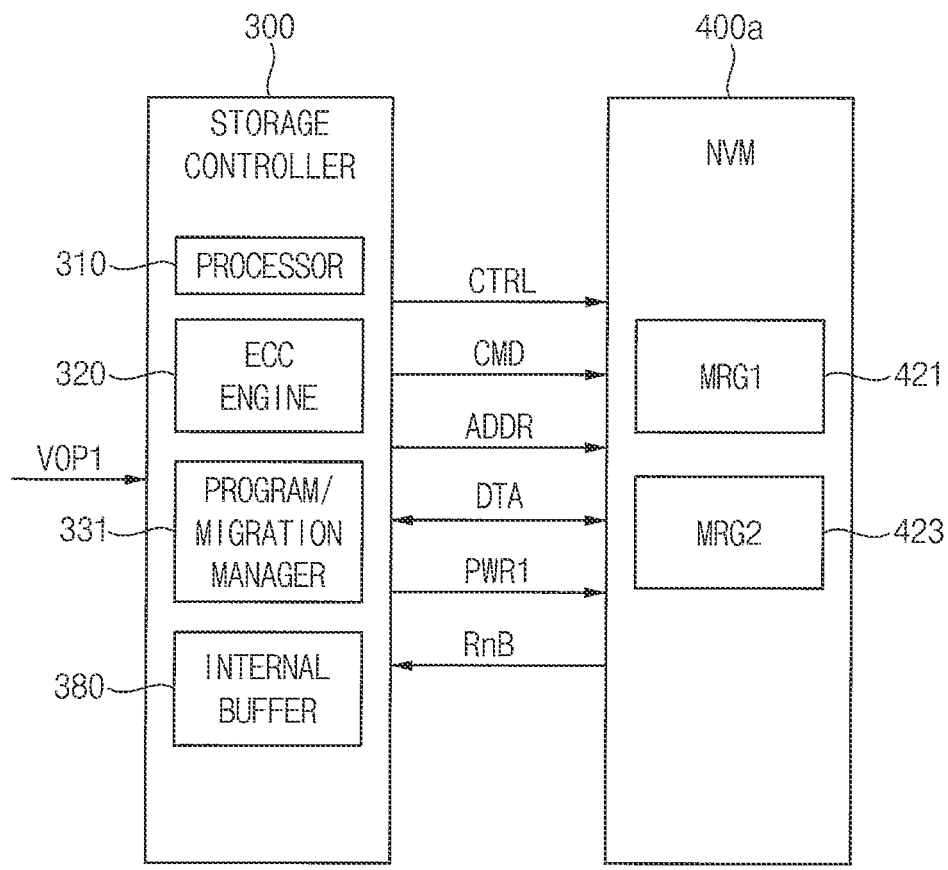
FIG. 4A is a block diagram illustrating a connection relationship between the storage controller and one nonvolatile memory device in the storage device of FIG. 1.
Figure 4B:
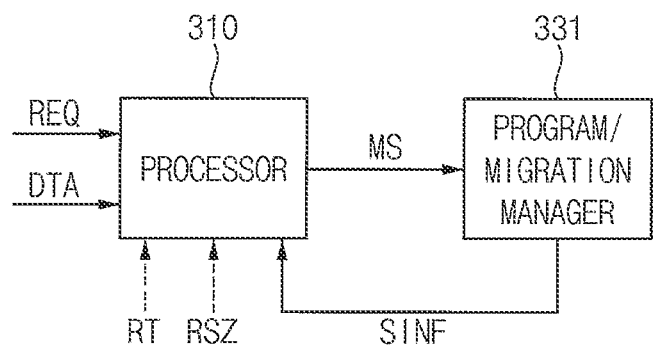
FIG. 4B illustrates a processor and a program/migration manager in FIG. 4A.

FIG. 4A is a block diagram illustrating a connection relationship between the storage controller and one nonvolatile memory device in the storage device of FIG. 1. FIG. 4B illustrates a processor and a program/migration manager in FIG. 4A.

FIG. 4A, assumes that a storage system 200a includes the storage controller 300 and the nonvolatile memory device NVM 400a.

Referring to FIG. 4A, the storage controller 300 may operate based on the first operating voltage VOP1.

The nonvolatile memory device 400a may perform an erase operation, a program operation, and/or a write operation under control of the storage controller 300. The nonvolatile memory device 400a may receive a command CMD and an address ADDR through input/output lines from the storage controller 300 and may receive a data DTA through the buffer memory 250 in FIG. 1 for performing such operations. In addition, the nonvolatile memory device 400a may receive a control signal CTRL through a control line and receives a power PWR1 through a power line from the storage controller 300. In addition, the nonvolatile memory device 400a may provide the storage controller 300 with the data DTA using the buffer memory 250 in FIG. 1.

The nonvolatile memory device 400a may provide the storage controller 300 with a status signal RnB indicating an operating status of the nonvolatile memory device 400a.

The nonvolatile memory device 400a may include a first memory region MRG1 421 and a second memory region MRG2 423.

The first memory region 421 may have a first write speed and the second memory region 423 may have a second write speed different from the first write speed. The first write speed may be faster than the second write speed. That is, the second write speed may be slower than the first write speed. For example, each first memory cells in the first memory region 421 may store N-bit data and each of second memory cells in the second memory region 423 may store M-bit data. Here, M and N may be natural numbers and M may be greater than M.

In exemplary embodiments, the first memory region 421 may be a single level cell region and the second memory region 423 may be a triple level cell region.

The storage controller 300 may include the processor 310, the ECC engine 320, the program/migration manager 331 and the internal buffer 380.

The ECC engine 320 may perform an ECC encoding operation on data DTA to be programmed in one of the first memory region 421 and the second memory region 423 and may perform an ECC decoding operation on data read from one of the first memory region 421 and the second memory region 423.

The program/migration manger 331 may control a program operation and a data migration operation, in response to a size of a valid region to store data of the first memory 421 region being smaller than a size of the first data to be programmed, by performing read operation-transfer operation to read a second data that is pre-stored in the first memory region 421 by a first unit corresponding to a size of the internal buffer 380 and to transfer the first unit of data to a data I/O circuit of the nonvolatile memory device 400a a plurality of times and by storing the second data transferred to the data I/O circuit in the second memory region 423. In exemplary embodiments, the program/migration manager 331 may perform a correction operation to provide the first unit of data to the ECC engine 320, to receive the first unit of data in which an error is corrected from the ECC engine 320 and to provide the first unit of data in which an error is corrected to the data I/O circuit a plurality of times.

When the first memory region 421 is a single level cell region and the second memory region 423 is a triple level cell region, the read operation-correction operation-transfer operation may be performed three times with respect to the second data.

The processor 310 may determine a write mode associated with the first data as one of a first mode to store the first data in the first memory region 421 by priority and a second mode to store the first data in the second memory region 423.

Referring to FIG. 4B, the processor 310 may determine the write mode as one of the first mode and the second mode based on a write request associated with the first data DTA. The processor 310 may determine whether the write request from the host 100 is consecutive based on an idle time and may determine the write mode as one of the first mode and the second mode based on a result of the determination associated with the consecutiveness. For example, the idle time corresponds to a time interval between a second write request and a first write request received prior to the second write request.

For example, the processor 310 may compare the idle time with a reference time interval RT, may determine that the current write request is consecutive with respect to the previous write request in response to the idle time being smaller than the reference time interval RT, may determine that the current write request is inconsecutive with respect to the previous write request in response to the idle time being equal to or greater than the reference time RT interval and may provide the program/migration manager 331 with a mode signal MS designating one of the first mode and the second mode.

For example, the processor 310 may perform a write operation on the current write request based on the first mode in response to determining that the current write request is consecutive. For example, the processor 310 may perform a write operation on the current write request based on the second mode in response to determining that the current write request is inconsecutive.

In an exemplary embodiment, the processor 310 may determine the write mode as one of the first mode and the second mode based on a size of the first data DTA. For example, the processor 310 may store the first data in the first memory region 421 in response to the size of the first data DTA being equal to or greater than a reference size RSZ. The processor 310 may store the first data DTA in the second memory region 423 in response to the size of the first data DTA being smaller than the reference size RSZ. The processor 310 may compare a size of the first data DTA with the reference size RSZ and may provide the program/migration manager 331 with the mode signal MS designating one of the first mode and the second mode based on a result of the comparison.

In an exemplary embodiment, the processor 310 may determine the write mode as one of the first mode and the second mode based on the status information SINF of the first memory region 421 and the second memory region 423, provided from the I program/migration manager 331. For example, the status information SINF may include at least one of program/erase cycle information of the first memory region 421 and the second memory region 423, a number of free blocks in the first memory region 421 and the second memory region 423 and data retention time information of the first memory region 421 and the second memory region 423. The processor 310 may provide the program/migration manager 331 with the mode signal MS designating one of the first mode and the second mode based on the status information SINE FIG. 4C is a timing diagram illustrating an operation of the storage device of FIG. 4A.

Figure 4C:
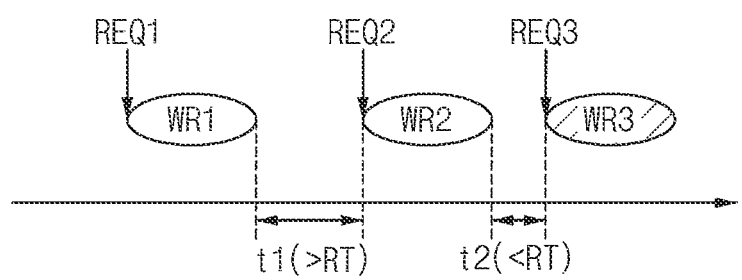
FIG. 4C is a timing diagram illustrating an operation of the storage device of FIG. 4A.

Referring to FIGS. 4A through 4C, the nonvolatile memory device 400a may perform a first write operation WR1, a second write operation WR2 and a third write operation WR3 under control of the storage controller 300. Each of the first write operation WR1, the second write operation WR2 and the third write operation WR3 may correspond to respective one of write requests REQ1, REQ2 and REQ3 from the host 100.

The nonvolatile memory device 400a may perform the first write operation WR1 under control of the storage controller 300. The nonvolatile memory device 400a may perform the first write operation WR1 in the second mode. The nonvolatile memory device 400a may program a corresponding data in the second memory region 423 under control of the storage controller 300.

After a first idle time t1 elapses from a time point when the first write operation WR1 is completed, the nonvolatile memory device 400a may perform the second write operation WR2 under control of the storage controller 300. The storage controller 300 may compare the first idle time t1 with the reference time interval RT. The first idle time t1 may correspond to a time interval between the time point when the first write operation WR1 is completed and a time point when the write request REQ2 is received (or, the second write operation WR2 is started). Because the first idle time t1 is greater than the reference time interval RT, the processor 310 determines that the write request REQ2 (a current write request) is inconsecutive with respect to the write request REQ1 (a previous write request). Therefore, the nonvolatile memory device 400a may perform the second write operation WR2 in the second mode under control of the storage controller 300.

After a second idle time t2 elapses from a time point when the second write operation WR2 is completed, the nonvolatile memory device 400a may perform the third write operation WR3 under control of the storage controller 300. The storage controller 300 may compare the second idle time t2 with the reference time interval RT. The second idle time t2 may correspond to a time interval between the time point when the second write operation WR2 is completed and a time point when the write request REQ3 is received (or, the third write operation WR3 is started). Because the second idle time t2 is smaller than the reference time interval RT, the processor 310 determines that the write request REQ3 (a current write request) is consecutive with respect to the write request REQ2 (a previous write request). Therefore, the nonvolatile memory device 400a may perform the third write operation WR3 in the first mode under control of the storage controller 300.

Figure 5:
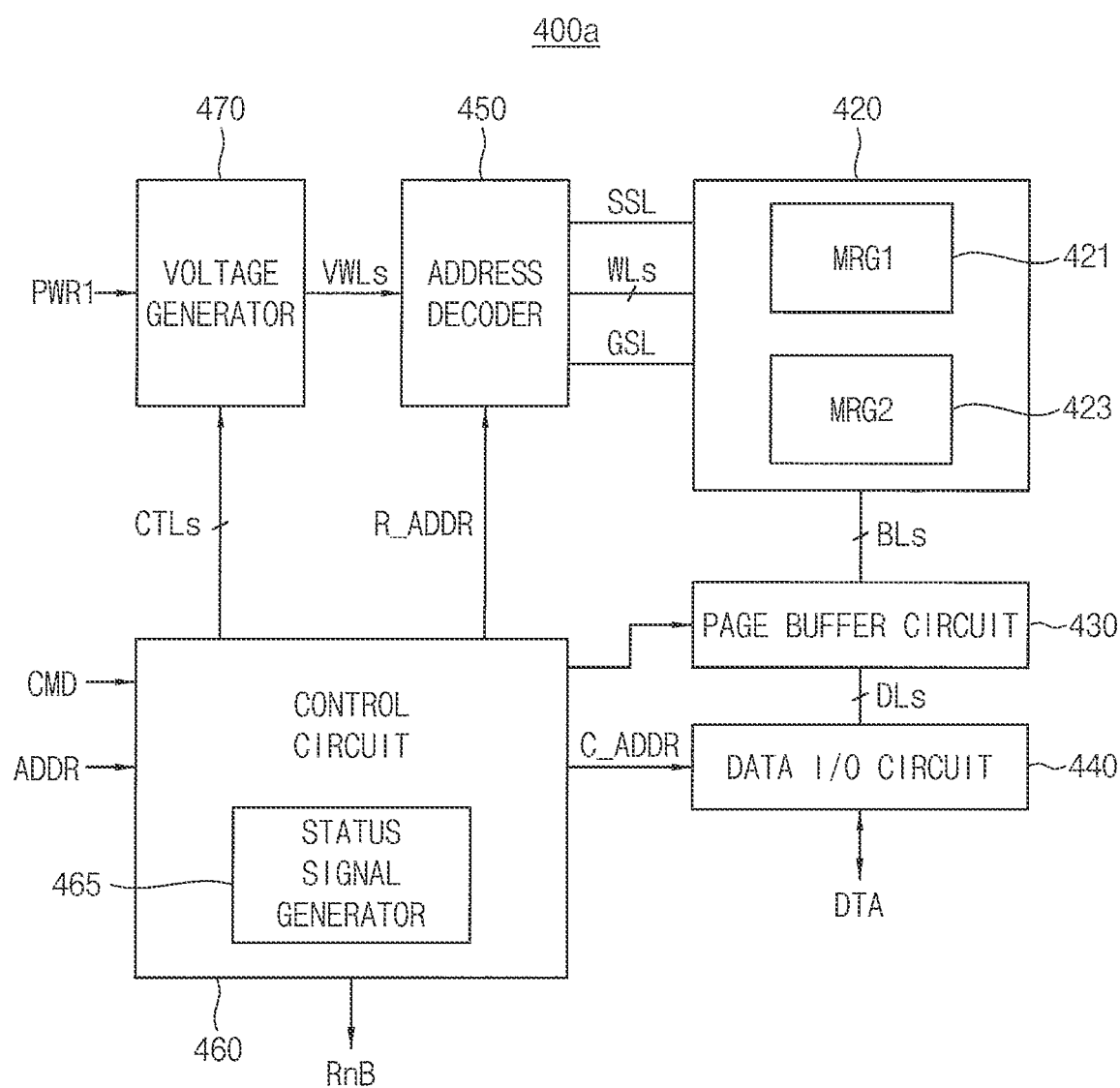
FIG. 5 is a block diagram illustrating the nonvolatile memory device in FIG. 4A according to some exemplary embodiments.

FIG. 5 is a block diagram illustrating the nonvolatile memory device in FIG. 4A according to some exemplary embodiments.

Referring to FIG. 5, the nonvolatile memory device 400a may include a memory cell array 420, an address decoder 450, a page buffer circuit 430, a data I/O circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs. The memory cell array 420 may include a plurality of memory cells coupled to the plurality of word-lines WLs and the plurality of bit-lines BLs. The memory cell array 420 may include the first memory region 421 and the second memory region 423.

In some exemplary embodiments, the memory cell array 420 may be or include a three-dimensional memory cell array, which is formed on a substrate in a three-dimensional structure (e.g., a vertical structure). In this case, the memory cell array 420 may include a plurality of NAND (cell) strings that are vertically oriented such that at least one memory cell is located over another memory cell.

Figure 6:
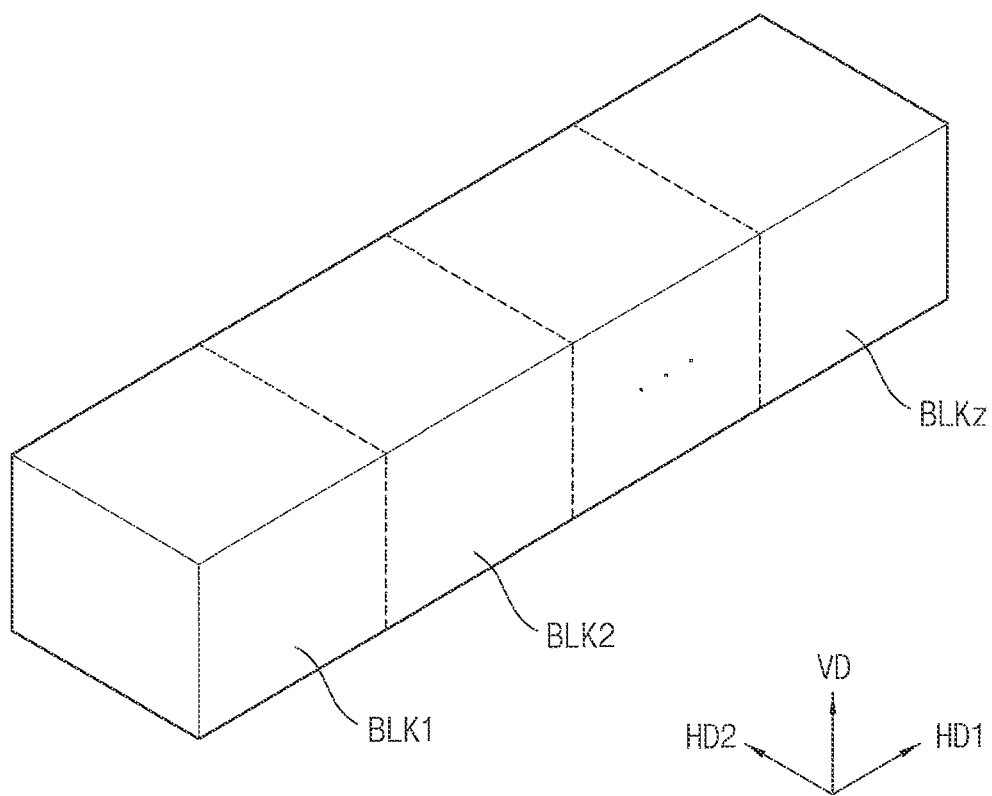
FIG. 6 is a block diagram illustrating the memory cell array in the nonvolatile memory device of FIG. 5.

FIG. 6 is a block diagram illustrating the memory cell array in the nonvolatile memory device of FIG. 5.

Referring to FIG. 6, the memory cell array 420 may include a plurality of memory blocks BLK1 to BLKz. Here, z is a natural number greater than two. The memory blocks BLK1 to BLKz extend along a first horizontal direction HD1, a second horizontal direction HD2 and a vertical direction VD. In some exemplary embodiments, the memory blocks BLK1 to BLKz are selected by the address decoder 450 in FIG. 5. For example, the address decoder 450 may select a memory block BLK corresponding to a block address among the memory blocks BLK1 to BLKz.

FIG. 7A is a circuit diagram illustrating one of the memory blocks of FIG. 6.

The memory block BLKi of FIG. 7A may be formed on a substrate SUB in a three-dimensional structure (or a vertical structure). Here, i may be one of 1 to z. For example, a plurality of (memory) cell strings included in the memory block BLKi may be formed in the vertical direction VD perpendicular to the substrate SUB.

Referring to FIG. 7A, the memory block BLKi may include (memory) cell strings NS11, NS21, NS31, NS12, NS22, NS32, NS13, NS23 and NS33 coupled between bit-lines BL1, BL2 and BL3 and a common source line CSL. Each of the memory cell strings NS11, NS21, NS31, NS12, NS22, NS32, NS13, NS23 and NS33 may include a string selection transistor SST, a plurality of memory cells MC1, MC2, MC3, MC4, MC6, MC7 and MC8, and a ground selection transistor GST. In FIG. 7A, each of the memory cell strings NS11, NS21, NS31, NS12, NS22, NS32, NS13, NS23 and NS33 is illustrated to include eight memory cells MC1, MC2, MC3, MC4, MC6, MC7 and MC8. However, exemplary embodiments are not limited thereto. In some exemplary embodiments, each of the cell strings NS11, NS21, NS31, NS12, NS22, NS32, NS13, NS23 and NS33 may include any number of memory cells.

The string selection transistor SST may be connected to corresponding string selection lines SSL1, SSl2 and SSL3. The plurality of memory cells MC1, MC2, MC3, MC4, MC6, MC7 and MC8 may be connected to corresponding word-lines WL1, WL2, WL3, WL5, WL5, WL6, WL7 and WL8, respectively. The ground selection transistor GST may be connected to corresponding ground selection lines GSL1, GSL2 and GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1, GSL2 and GSL3 and the string selection lines SSL1, SS12 and SSL3 may be separated.

Figure 7B:
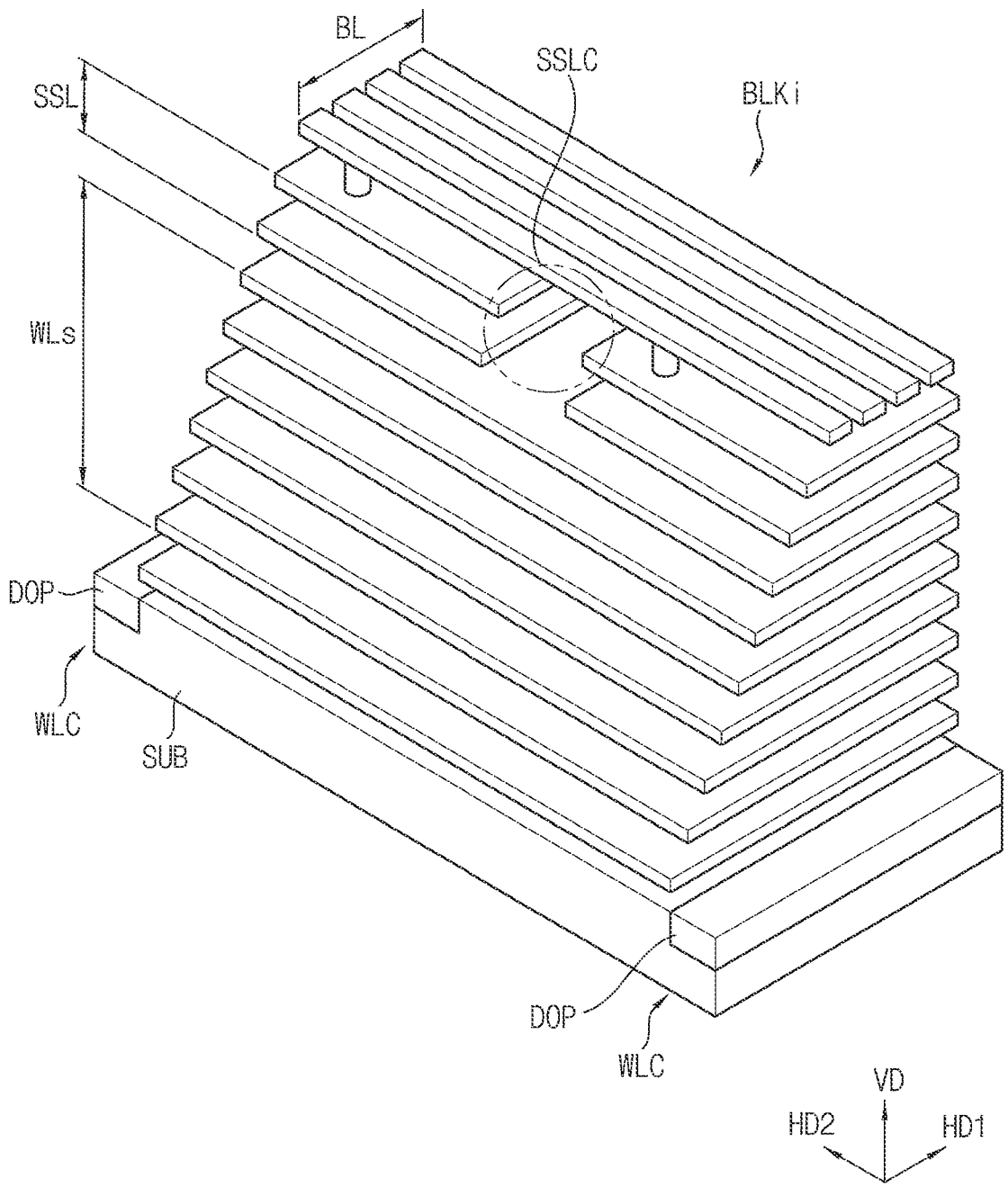
FIG. 7B is a perspective view illustrating one of the memory blocks in FIG. 6.

FIG. 7B is a perspective view illustrating one of the memory blocks in FIG. 6.

Referring to FIG. 7B, the memory block BLKi may be implemented such that at least one ground selection line GSL, a plurality of word-lines WLs and at least one string selection line SSL are stacked on a substrate between word-line cut regions WLC. Doping regions DOP may be formed in top portions of the substrate of the word-line cut regions WLC. The doping region may be used as common source lines CSL or common source nodes CSN to which a common source voltage is applied. The at least one string selection line SSL may be divided by a string selection line cut region SSLC extending in the first horizontal direction HD1.

A plurality of vertical channels or channel holes penetrate the at least one ground selection lines GSL, the plurality of word-lines WLs and the at least one string selection lines SSL. The at least one ground selection lines GSL, the plurality of word-lines WL and the at least one string selection lines SSL may be formed in the shape of planks. Bit-lines BL are connected to top surfaces of the channel holes.

Figure 7C:
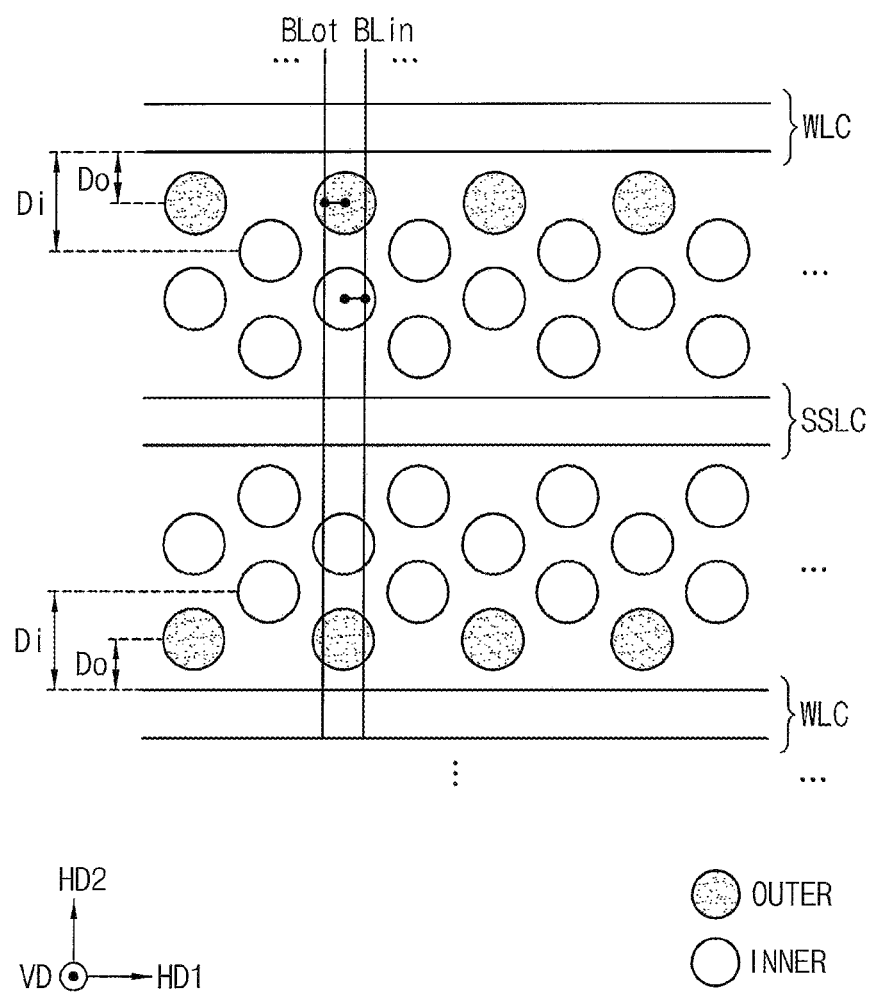
FIG. 7C is a top view of an example of the memory block of FIG. 6.

FIG. 7C is a top view of an example of the memory block of FIG. 6.

In FIG. 7C, white circles represent inner cells or inner channel holes and dotted circuits represent outer cells or outer channel holes. The common source lines corresponding to the doping region DOP in FIG. 7B are disposed in the word-line cut regions WLC.

Referring to FIG. 7C, the channel holes may be formed in a zig-zag structure in the memory block BLKi. Through the zig-zag structure, the area of the memory block BLKi may be reduced. Outer channel holes and inner channel holes are disposed in the second horizontal direction HD2 between the adjacent two word-line cut regions WLC in the memory block BLKi. One of the inner channel holes and the outer channel holes may be connected to even-numbered bit-lines and the other may be connected to odd-numbered bit-lines. For convenience of illustration, only one bit-line pair BLot and BLin are illustrated and the other bit-lines are omitted in FIG. 7C.

As illustrated in FIG. 7C, the outer cells may be formed in the outer channel holes and the inner cells may be formed on the inner channel holes where a distance Do between the outer channel hole and the word-line cut region WLC is smaller than a distance Di between the inner channel hole and the word-line cut region WLC.

Figure 8:
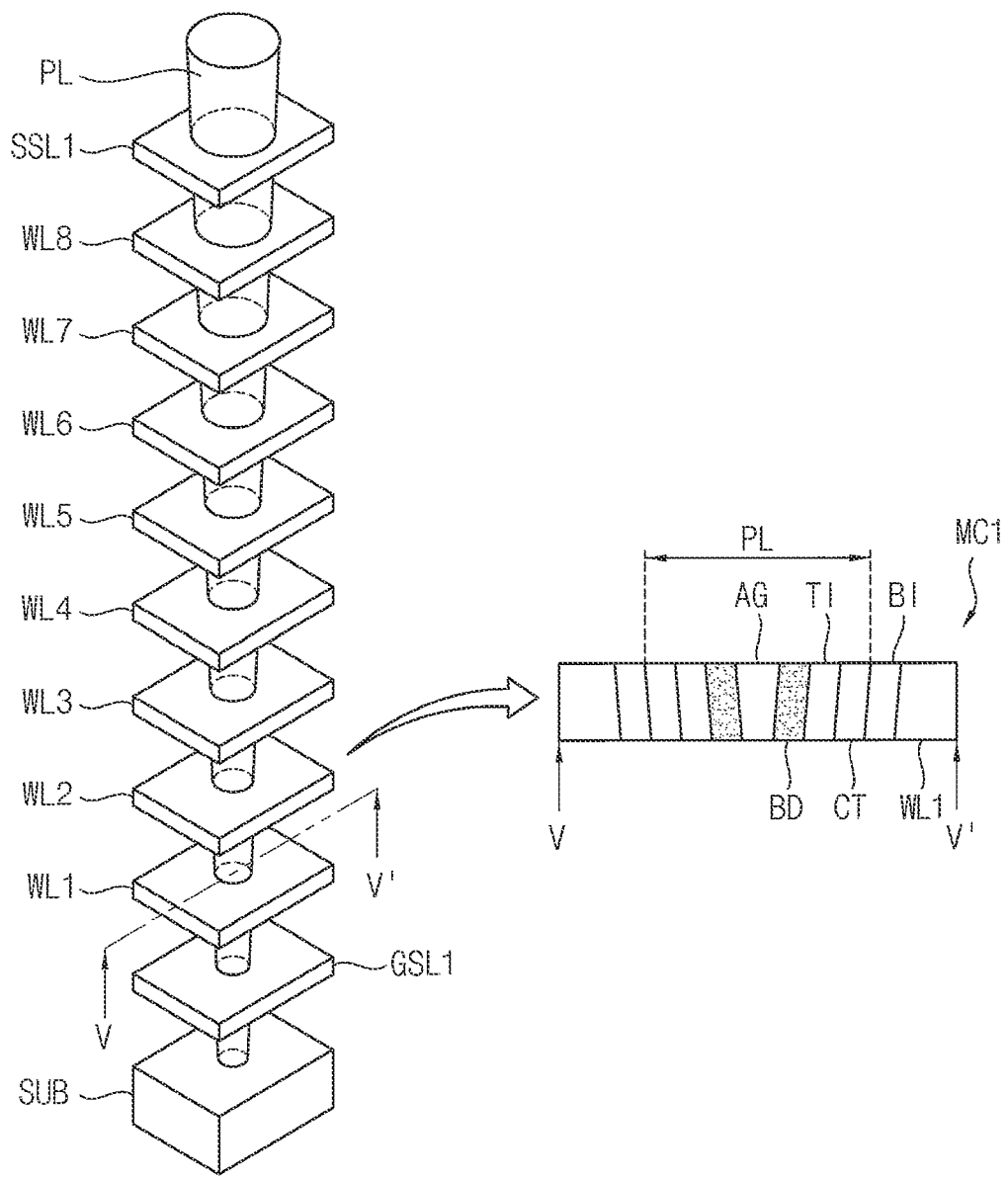
FIG. 8 illustrates an example of a structure of a NAND cell string CS in the memory block of FIG. 7A.

FIG. 8 illustrates an example of a structure of a NAND cell string CS in the memory block of FIG. 7A.

Referring to FIGS. 7A and 8, a pillar PL is provided on the substrate SUB such that the pillar PL extends in a direction perpendicular to the substrate SUB, for example a vertical direction VD, to make contact with the substrate SUB. Each of the ground selection line GSL, the word lines WL1 to WL8, and the string selection lines SSL illustrated in FIG. 8 may be formed of a conductive material parallel with the substrate SUB, for example, a metallic material. The pillar PL may be in contact with the substrate SUB through the conductive materials forming the string selection lines SSL, the word lines WL1 to WL8, and the ground selection line GSL.

A sectional view taken along a line V-V' is also illustrated in FIG. 8. In some exemplary embodiments, a sectional view of a first memory cell MC1 corresponding to a first word line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Figure 9:
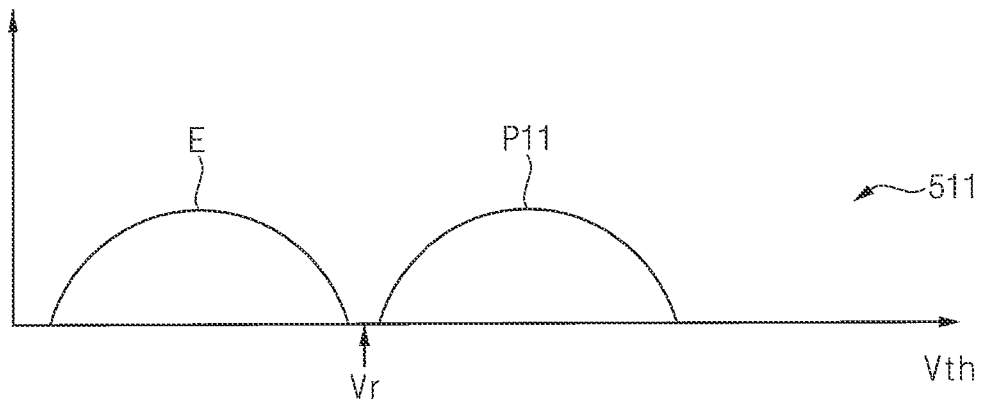
FIG. 9 illustrates threshold voltage distributions of the first memory region and threshold voltage distributions of the second memory region.
Figure 9:
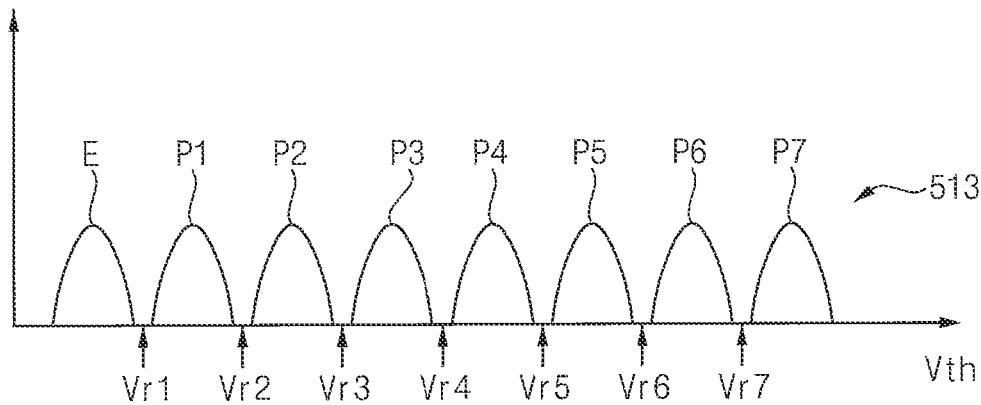

FIG. 9 illustrates threshold voltage distributions of the first memory region and threshold voltage distributions of the second memory region.

In FIG. 9, a reference numeral 511 illustrates threshold voltage distributions of first memory cells in the first memory region 421 including an erase state E and a first program state P11 and a reference numeral 513 illustrates threshold voltage distributions of second memory cells in the second memory region 423 including an erase state E and first through seventh program states P1, P2, P3, P4, P5, P6 and P7.

In FIG. 9 a first read voltage Vr is used to discriminate the erase state E and the first program state P11 and respective one of read voltages Vr1, Vr2, Vr3, Vr4, Vr5, Vr6 and Vr7 is used to discriminate two adjacent program states from among the erase state E and the first through seventh program states P1, P2, P3, P4, P5, P6 and P7.

Figure 10:
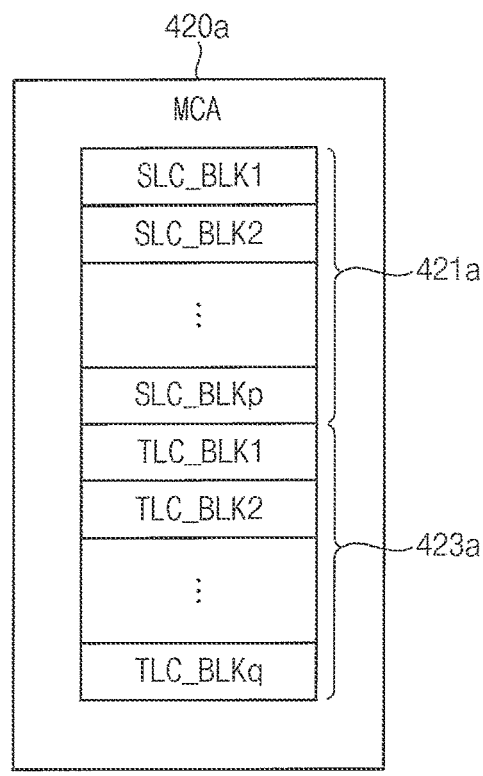
FIGS. 10 and 11 illustrate examples of the memory cell array in FIG. 5, respectively, according to exemplary embodiments.
Figure 11:
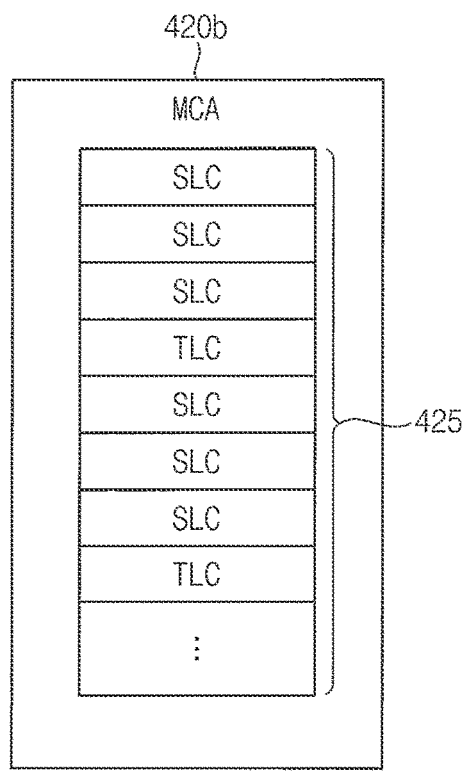

FIGS. 10 and 11 illustrate examples of the memory cell array in FIG. 5, respectively, according to exemplary embodiments.

Referring to FIG. 10, a memory cell array 420a may include a first memory region 421a and a second memory region 423a. The first memory region 421a may include a plurality of SLC blocks SLC_BLK1 to SLC_BLKp and the second memory region 423a may include a plurality of TLC blocks TLC_BLK1 to TLC_BLKq. Here, p and q are natural numbers greater than one.

Referring to FIG. 11, a memory cell array 420b may include a plurality of (memory) blocks 425. In some exemplary embodiments, the blocks 425 may be SLC blocks and/or TLC blocks. FIG. 11 shows an example where every four blocks includes three SLC blocks and a single TLC block.

Figure 12:
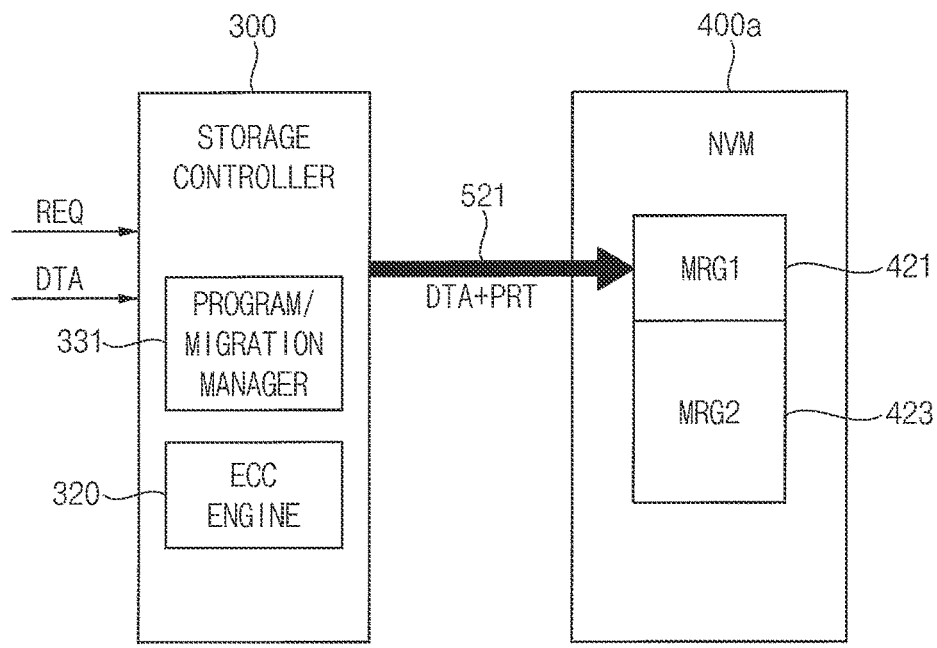
FIGS. 12 and 13 illustrate that the storage device of FIG. 4A performs a write operation in the first mode and the second mode, respectively, according to exemplary embodiments.
Figure 13:
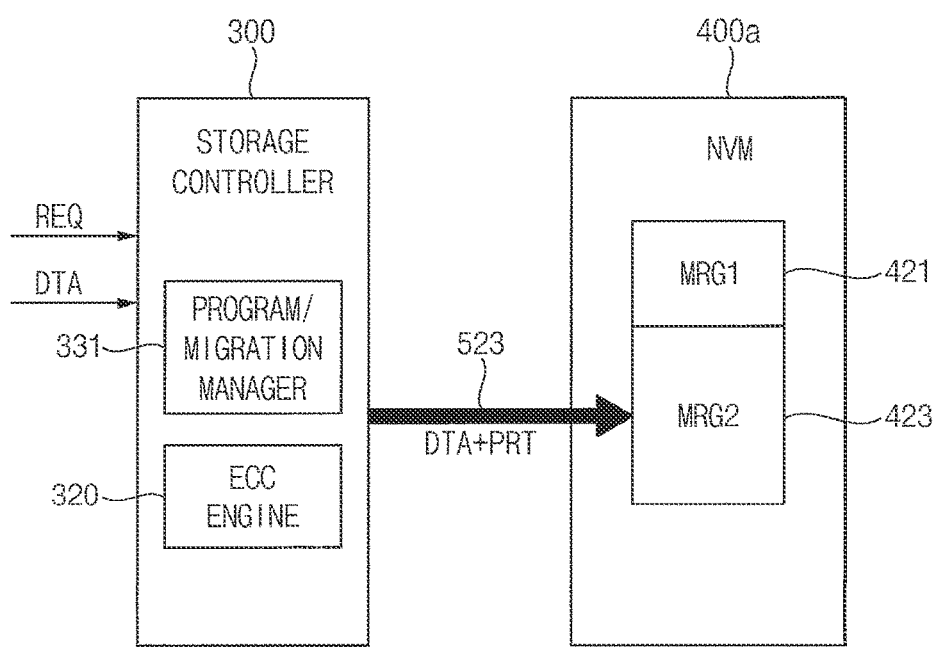

FIGS. 12 and 13 illustrate that the storage device of FIG. 4A performs a write operation in the first mode and the second mode, respectively, according to exemplary embodiments.

Referring to FIG. 12, when the storage device 400a is to perform a write operation in the first mode, the storage controller 300 designates the write mode as the first mode in response to the write request REQ, the ECC engine 320 performs an ECC encoding operation on the write data DTA to generate a parity data PRT, and the program/migration manager 331 stores the write data DTA and the parity data PRT in the first memory region 421 of the nonvolatile memory device 400 as a reference numeral 521 indicates.

Referring to FIG. 13, when the storage device 400a is to perform a write operation in the second mode, the storage controller 300 designates the write mode as the second mode in response to the write request REQ, the ECC engine 320 performs an ECC encoding operation on the write data DTA to generate a parity data PRT, and the program/migration manager 331 stores the write data DTA and the parity data PRT in the second memory region 423 of the nonvolatile memory device 400 as a reference numeral 523 indicates.

Figure 14:
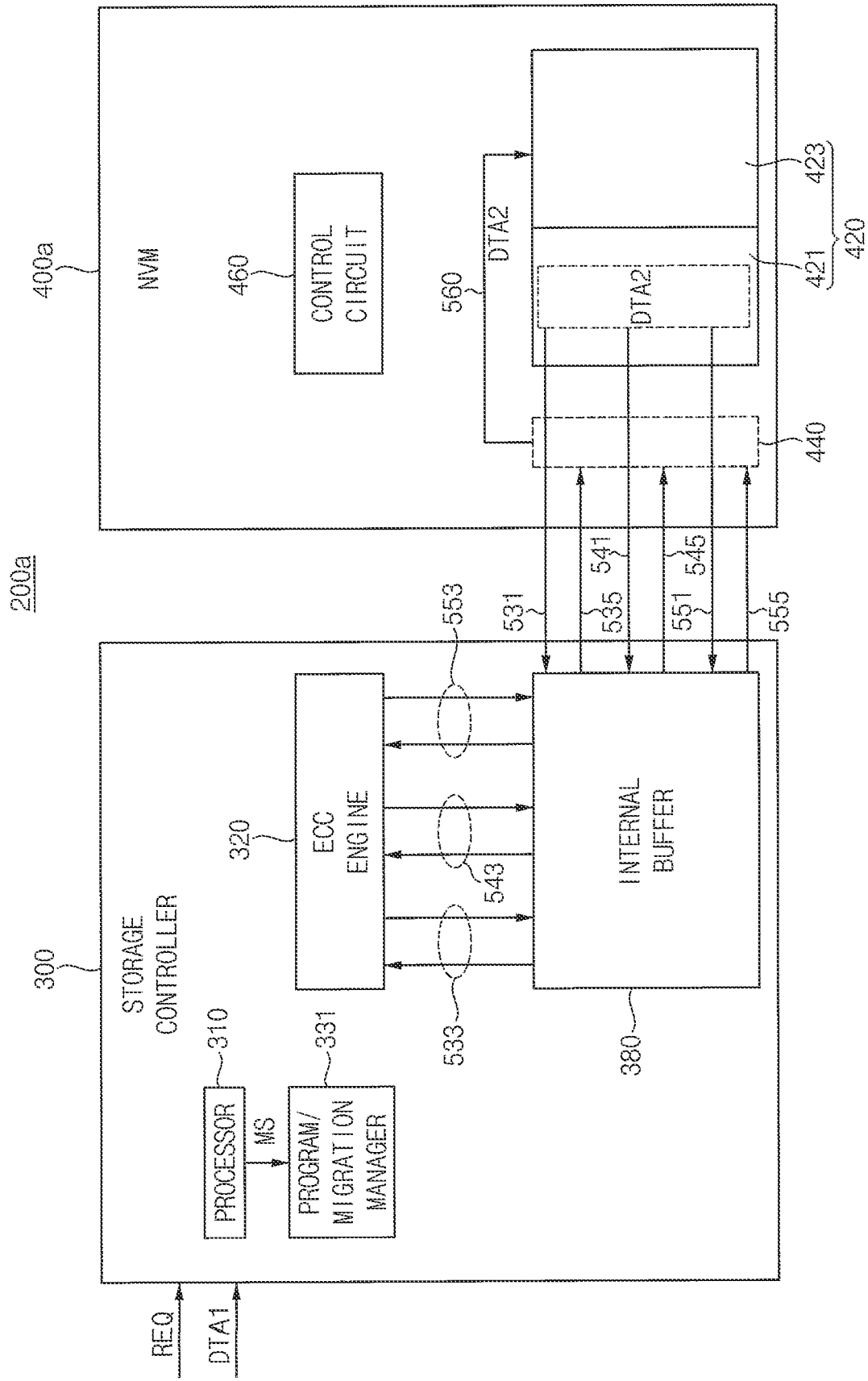
FIG. 14 illustrates that the storage device of FIG. 4A performs a data migration operation in the first mode according to exemplary embodiments.

FIG. 14 illustrates that the storage device of FIG. 4A performs a data migration operation in the first mode according to exemplary embodiments.

Referring to FIG. 14, when the storage controller 300 designates the write mode as the first mode in response to the write request REQ and is to perform a write operation to store a first data DTA1 in the first memory region 421, in response to a size of a valid region to store data, of the first memory region 421 being smaller than a size of the first memory region 421, the nonvolatile memory device 400a, under control of the program/migration manager 331, reads a second data DTA2 that is pre-stored in the first memory region 421 by a first unit corresponding to a data storage capacity of the internal buffer 380 and provides the first unit of data to the internal buffer 380 as a reference numeral 531 indicates. The first unit of read data may include a user data portion and a parity data portion which correspond to a portion of the second data DTA2.

The internal buffer 380 provides the first unit of data to the ECC engine 320 and the ECC engine 320 performs an ECC decoding on the first unit of data to correct an error in the first unit of data and provides the internal buffer 380 with the first unit of data in which the error is corrected (e.g., the corrected first unit of data) as a reference numeral 533 indicates.

While the internal buffer 380 provides the corrected first unit of data to the data I/O circuit 440 of the nonvolatile memory device 400a as a reference numeral 535 indicates, the internal buffer 380 receives another first unit of data read from the first memory region 421 as a reference numeral 541 indicates.

The internal buffer 380 provides the first unit of data to the ECC engine 320 and the ECC engine 320 performs an ECC decoding on the first unit of data to correct an error in the first unit of data and provides the internal buffer 380 with the first unit of data in which the error is corrected (e.g., the corrected first unit of data) as a reference numeral 543 indicates.

While the internal buffer 380 provides the corrected first unit of data to the data I/O circuit 440 of the nonvolatile memory device 400a as a reference numeral 545 indicates, the internal buffer 380 receives still another first unit of data read from the first memory region 421 as a reference numeral 551 indicates.

The internal buffer 380 provides the first unit of data to the ECC engine 320 and the ECC engine 320 performs an ECC decoding on the first unit of data to correct an error in the first unit of data and provides the internal buffer 380 with the first unit of data in which the error is corrected (e.g., the corrected first unit of data) as a reference numeral 553 indicates.

The internal buffer 380 provides the corrected first unit of data to the data I/O circuit 440 of the nonvolatile memory device 400a as a reference numeral 555 indicates and the page buffer circuit 420 stores the second data DTA2 in the second memory region 423 as a reference numeral 560 indicates. Accordingly, the data migration operation is completed.

Figure 15A:
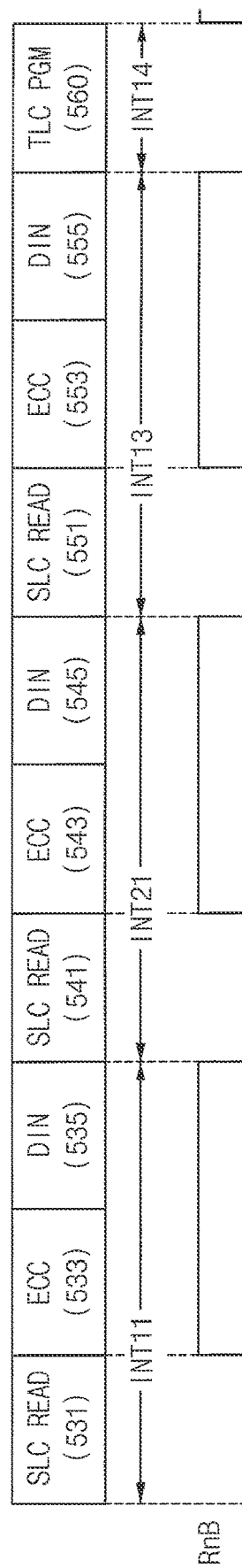
FIG. 15A illustrates an operation sequence of the storage device of FIG. 14 according to an exemplary embodiment.

FIG. 15A illustrates an operation sequence of the storage device of FIG. 14 according to an exemplary embodiment.

Referring to FIGS. 14 and 15A, during a first interval INT11, the nonvolatile memory device 400a reads the second data DTA2 that is pre-stored in the first memory region 421 by the first unit (SLC read) and provides the first unit of data to the internal buffer 380 (531), the internal buffer 380 provides the first unit of data to the ECC engine 320 and the ECC engine 320 performs an ECC decoding on the first unit of data (533) and the internal buffer 380 provides the corrected first unit of data to the data I/O circuit 440 (DIN, 535).

During a second interval INT12, the nonvolatile memory device 400a, reads the second data DTA2 from the first memory region 421 by the first unit (SLC read) and provides the first unit of data to the internal buffer 380 (541), the internal buffer 380 provides the first unit of data to the ECC engine 320 and the ECC engine 320 performs an ECC decoding on the first unit of data (543) and the internal buffer 380 provides the corrected first unit of data to the data I/O circuit 440 (DIN, 545).

During a third interval INT13, the nonvolatile memory device 400a, reads the second data DTA2 from the first memory region 421 by the first unit (SLC read) and provides the first unit of data to the internal buffer 380 (551), the internal buffer 380 provides the first unit of data to the ECC engine 320 and the ECC engine 320 performs an ECC decoding on the first unit of data (553) and the internal buffer 380 provides the corrected first unit of data to the data I/O circuit 440 (DIN, 555). During a fourth interval INT14, the page buffer circuit 420 stores the second data DTA2 in the second memory region 423 (560) by performing a TLC program on the second data DTA2 to complete the data migration operation.

In FIG. 15A, the status signal RnB has a logic low level indicating a busy state during in each of interval 531, 541 554 in which a read operation is performed in each of the first, second and third intervals INT 11, INT12 and INT 13 and the fourth interval INT14.

Figure 15B:
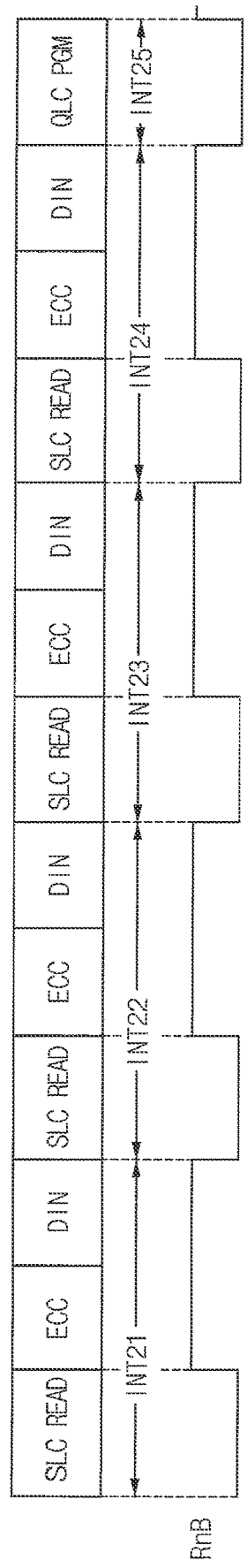
FIG. 15B illustrates an operation sequence of the storage device of FIG. 14 according to exemplary embodiments.

FIG. 15B illustrates an operation sequence of the storage device of FIG. 14 according to exemplary embodiments.

In FIG. 15B, assuming that the second memory region 423 is a quadruple level cell (QLC) and a size of a valid region to store data, of the first memory region 421 is smaller than a size of the first memory region 421.

Referring to FIG. 15B, during each of first through fourth intervals INT21, INT 22, INT23 and INT24, the nonvolatile memory device 400*a* reads the second data DTA2 that is pre-stored in the first memory region 421 by the first unit (SLC read) and provides the first unit of data to the internal buffer 380, the internal buffer 380 provides the first unit of data to the ECC engine 320 and the ECC engine 320 performs an ECC decoding on the first unit of data (ECC) and the internal buffer 380 provides the corrected first unit of data to the data I/O circuit 440 (DIN). During a fifth interval INT25, the page buffer circuit 420 stores the second data DTA2 in the second memory region 423 by performing a QLC program on the second data DTA2 to complete the data migration operation.

That is, exemplary embodiments may be applicable to a case when the second memory cells in the second memory region 423 are QLCs or memory cells to store five bits or more.

Figure 16:
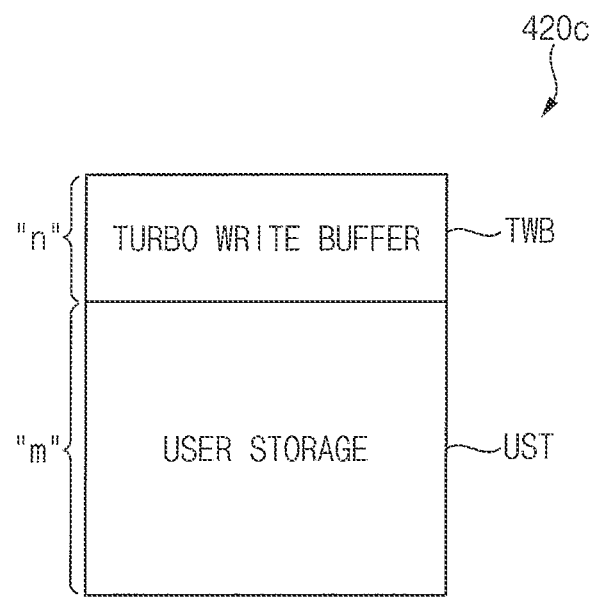
FIG. 16 is a block diagram of an example of the memory cell array in FIG. 5 according to exemplary embodiments.

FIG. 16 is a block diagram of an example of the memory cell array in FIG. 5 according to exemplary embodiments.

A memory cell array 420*c* may indicate a physical region of the nonvolatile memory device 400*a*, in which user data are actually stored. In other words, the physical storage space may be a space that is identified by the host 100 as a capacity of the storage device 200*a*.

Referring to FIG. 16, the memory cell array 420*c* may include a turbo write buffer area (TWB) (hereinafter referred to as a "turbo write buffer") and a user storage region (UST) (hereinafter referred to as a "user storage").

The turbo write buffer TWB may correspond to a portion (e.g., "a") of the physical storage space of the nonvolatile memory device 400*a*. The user storage UST may correspond to the remaining portion (e.g., "b") of the physical storage space of the nonvolatile memory device 400*a*. Alternatively, the user storage UST may correspond to the entire (e.g., a+b) physical storage space of the nonvolatile memory device 400*a*.

In exemplary embodiments, each memory cell corresponding to the turbo write buffer TWB may be an SLC, and each memory cell corresponding to the user storage UST may be a TLC. Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be a region supporting a higher write speed than the user storage UST.

In exemplary embodiments, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and QLC).

The storage device 200*a* may support a normal write function and a turbo write function. When the turbo write function is enabled by the host 100, the storage device 200*a* may perform the turbo write operation. When the turbo write function is disabled by the host 100, the storage device 200*a* may perform the normal write operation.

For example, in the case where the turbo write function is enabled, the storage device 200*a* may preferentially write the write data received from the host 100 in the turbo write buffer TWB. In this case, because write data received from the host 100 is written in the turbo write buffer TWB (e.g., SLC program), a fast operating speed may be secured compared to the case where the normal write operation (e.g., TLC program) is performed on the user storage UST. In the case where the turbo write function is disabled, the storage device 200*a* may not first write the write data in the turbo write buffer TWB. Depending on an internally assigned policy (e.g., a normal write policy), the storage device 200*a* may directly write the write data in the user storage UST or may write the write data in the turbo write buffer TWB. How to write the write data may be determined based on various factors, such as the data share of the turbo write buffer TWB and a status of the physical storage space depending on the normal write policy.

In exemplary embodiments, data written in the turbo write buffer TWB may be flushed or migrated to the user storage UST depending on an explicit command from the host 100 or an internally assigned policy.

Figure 17:
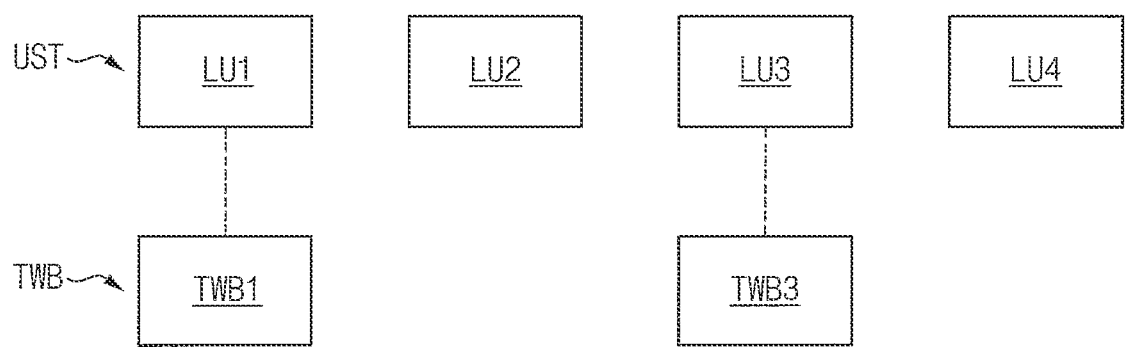
FIGS. 17 and 18 illustrate example turbo write buffer types of FIG. 16.
Figure 18:
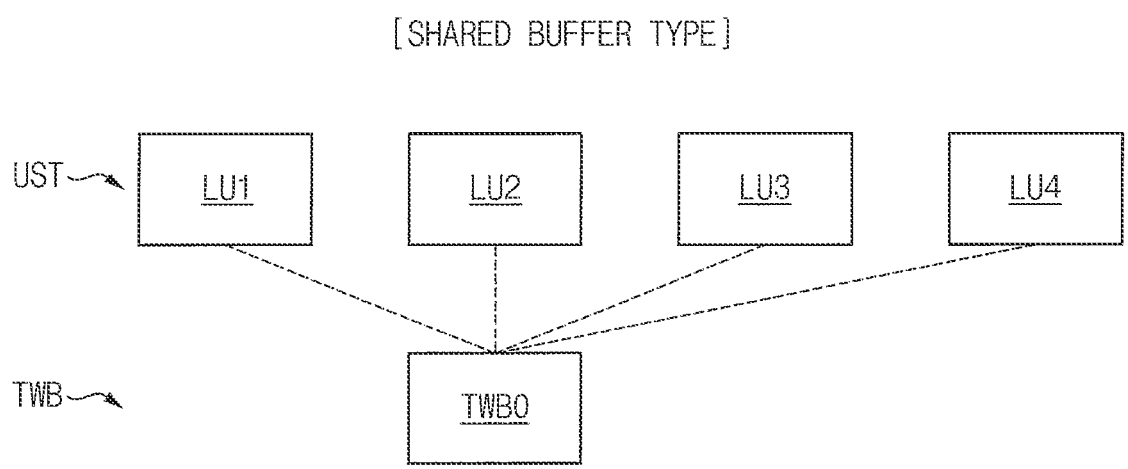

FIGS. 17 and 18 illustrate example turbo write buffer types of FIG. 16.

Referring to FIGS. 4A and 16 through 18, the storage device 200*a* may include first, second, third and fourth logical units LU1, LU2, LU3 and LU4. Each of the first to fourth logical units LU1 to LU4 may be an externally addressable, independent, processing entity that processes a command from the host 100. The host 100 may manage the storage space of the storage device 200*a* through the first to fourth logical units LU1 to LU4. Each of the first to fourth logical units LU1 to LU4 may be used to store data at the storage device 200*a*.

Each of the first to fourth logical units LU1 to LU4 may be associated with at least one memory block of the nonvolatile memory device 400*a*. Various kinds of logical units that are used for various purposes may exist. However, the first to fourth logical units LU1 to LU4 may correspond to the physical storage space and may be used to store data of the host 100.

The first to fourth logical units LU1 to LU4 are illustrated in FIGS. 17 and 18, but exemplary embodiments are not limited thereto. For example, the storage device 200*a* may further include other logical units for storing and managing user data, as well as the first to fourth logical units LU1 to LU4. Alternatively, the storage device 200*a* may further include other logical units for supporting various functions, as well as the first to fourth logical units LU1 to LU4.

The turbo write buffer TWB of the storage device 200*a* may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 17, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 17, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data maybe preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4.

In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In exemplary embodiments, capacities of the first and third turbo write buffers TWB1 and TWB3 may be set independently of each other. However, exemplary embodiments are not limited thereto. For example, the number of logical units to which turbo write buffers are respectively assigned, a capacity of each turbo write buffer, etc., may be variously changed or modified.

In exemplary embodiments, a size of the turbo write buffer TWB for each logical unit may be set to a turbo write buffer size field per unit of a unit descriptor. In exemplary embodiments, the turbo write buffer size field per unit may be a configurable parameter.

In the case of the shared buffer type, one turbo write buffer maybe configured with respect to all the logical units. For example, as illustrated in FIG. 18, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 200a may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 19:
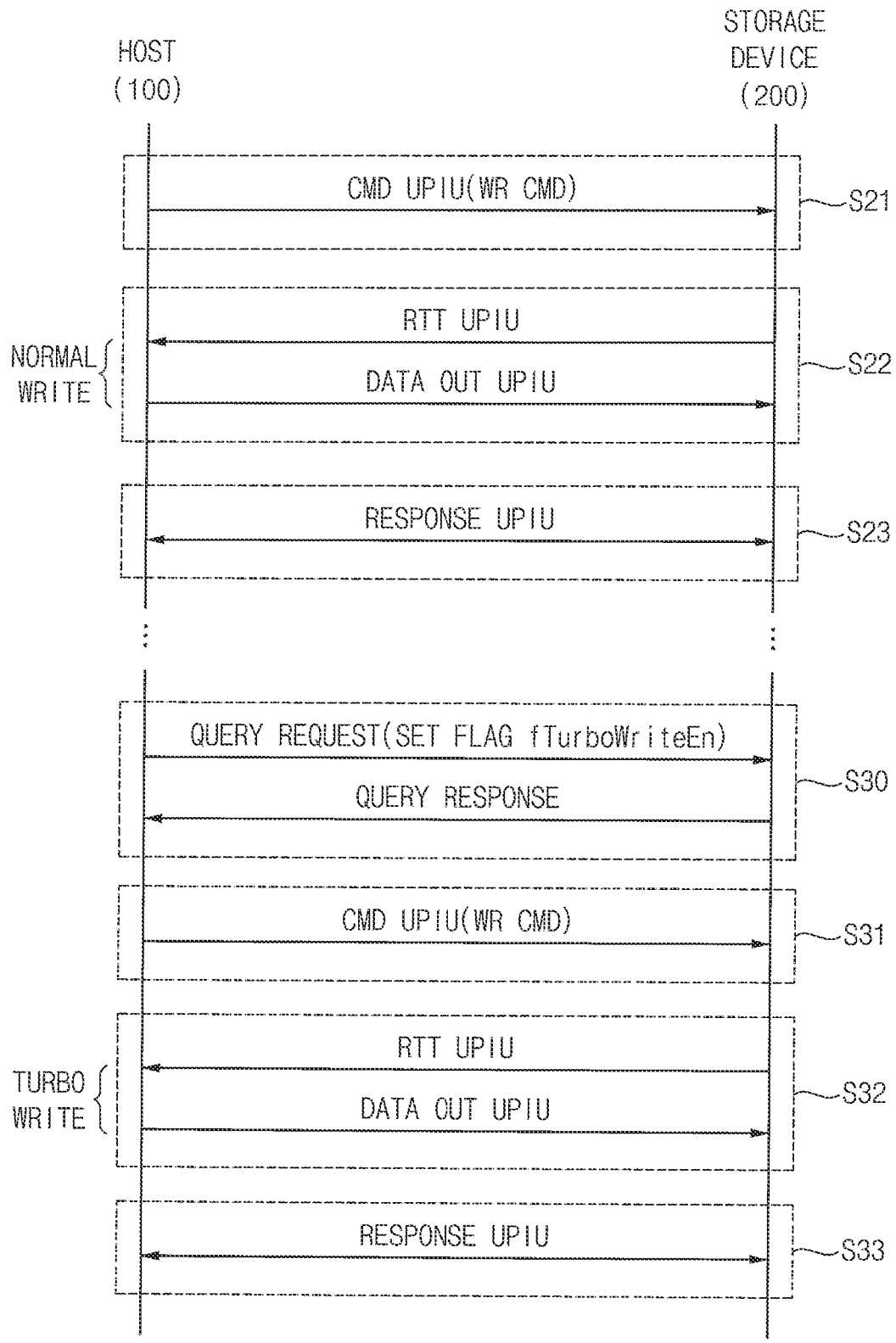
FIG. 19 is a flowchart illustrating an operation of a storage system of FIG. 1.

FIG. 19 is a flowchart illustrating an operation of a storage system of FIG. 1. A write operation of the storage system 50 will be described with reference to FIGS. 1 and 19.

In operation S21, the host 100 may transfer a CMD UPIU including a write command WR CMD to the storage device 200.

In operation S22, the host 100 and the storage device 200 may perform data transaction. For example, the storage device 200 may transfer a ready to transfer UPIU (RTT UPIU) to the host 100. The RTTUPIU may include information about a data range where the storage device 200 is able to receive data. The host 100 may transfer a DATA OUT UPIU including the write data to the storage device 200 in response to the RTT UPIU. As the above-described operation is repeatedly performed, the write data may be transferred from the host 100 to the storage device 200.

After all of the write data are received, in operation S23, the storage device 200 may transfer a RESPONSE UPIU to the host 100. The RESPONSE UPIU may include information indicating that an operation corresponding to the write command received in operation S21 is completed.

In exemplary embodiments, the storage device 200 may perform a normal write operation on the write data received in operation S22. For example, in operation S21, the storage device 200 may determine whether the turbo write function is enabled. More specifically, the storage device 200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In exemplary embodiments, a value of the turbo write enable field of the flag may be set by a query request for a set flag of the host 100.

A value of the turbo write enable field may not be set by the host 100. In this case, the write data received in operation S22 may be written in the turbo write buffer TWB or the user storage UST in compliance with the normal write policy.

In operation S30, the host 100 may set a value of the turbo write enable field to a particular value (e.g., "1b"). For example, the host 100 may transfer a query request for setting a value of the turbo write enable field to a particular value (e.g., "1b") to the storage device 200. A value of the turbo write enable field may be set to a particular value (e.g., "1b") in response to the query request from the host 100, and the storage device 200 may transfer a query response to the host 100.

Afterwards, the host 100 may perform operation S31 to operation S33. Operation S31 to operation S33 may be similar to operation S21 to operation S23 except that the turbo write is performed depending on the turbo write enable field, and thus, additional description will be omitted to avoid redundancy.

In exemplary embodiments, the write data received in operation S32 may be written in the turbo write buffer TWB. For example, in operation S30, as a value of the turbo write enable field is set to a particular value (e.g., "1b"), the turbo write function maybe enabled. In this case, the write data received from the host 100 maybe written in the turbo write buffer TWB. For example, in operation S31, the data received from the host 100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 20.

In exemplary embodiments, even though the turbo write function is enabled, in the case where a space of the turbo write buffer TWB is insufficient, the storage device 200 may write the received write data in the user storage UST. In exemplary embodiments, even though the turbo write function is enabled, in the case where a space of the turbo write buffer TWB is insufficient, the storage device 200 may write the received write data in the turbo write buffer TWB after performing the data migration operation using the internal buffer 380 of the storage controller 300.

Figure 20:
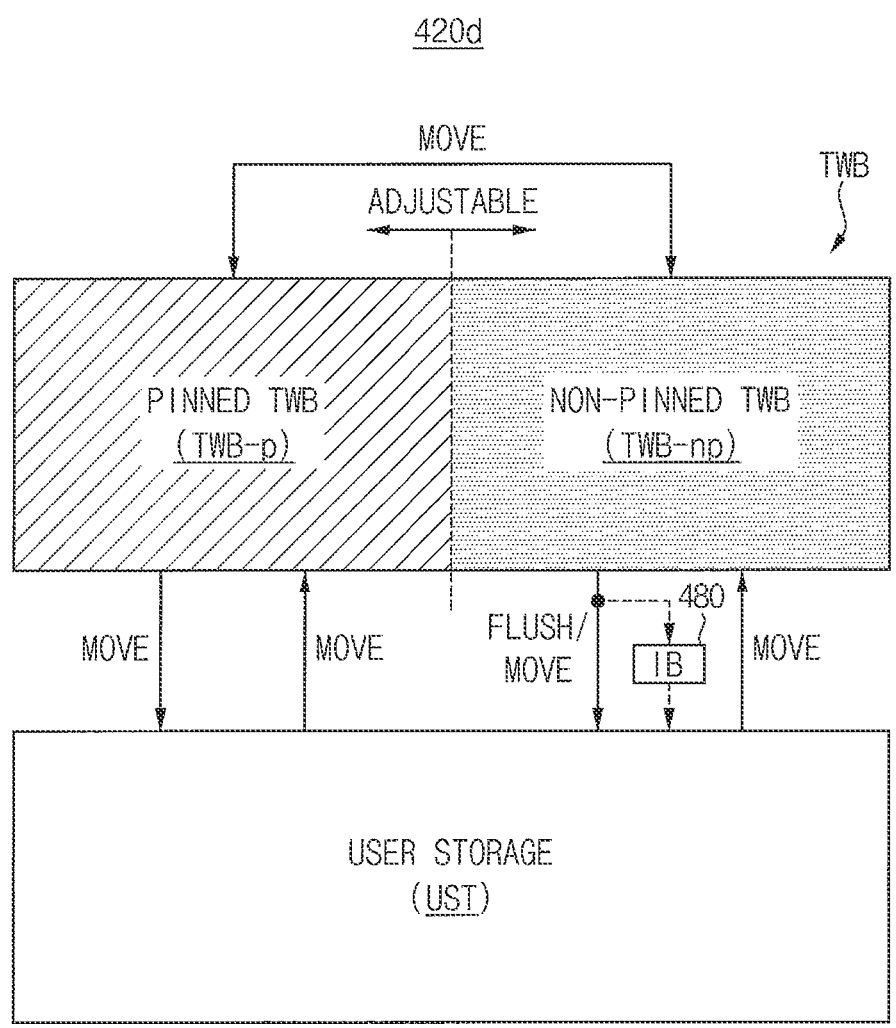
FIG. 20 is a block diagram illustrating a physical storage space of the storage device of FIG. 1.

FIG. 20 is a block diagram illustrating a physical storage space of the storage device of FIG. 1.

Referring to FIGS. 1 and 20, a memory cell array 420d corresponding to a physical storage space of the storage device 200 may include the turbo write buffer TWB and the user storage UST. The physical storage space, the turbo write buffer TWB, and the user storage UST of the storage device 200 are described above, and thus, additional description may be omitted to avoid redundancy.

The turbo write buffer TWB may be divided into a pinned turbo TWB-p and a non-pinned turbo write buffer TWB-np. As in the above description, in the case where the turbo write function of the storage device 200 is enabled, the write data may be stored in one of the pinned turbo write buffer TWB-p and the non-pinned turbo write buffer TWB-np.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In exemplary embodiments, as described above, the size of the turbo write buffer TWB may be determined under control of the host 100 or depending on the internal policy of the storage device 200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In exemplary embodiments, user data maybe flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 100, an internal policy of the storage device 1200, or a change of the internal policy according to a request of the host 100.

Alternatively, the user data may move between the non-pinned turbo write buffer TWB-np and the user storage UST depending on the explicit request of the host 100, the internal policy of the storage device 200, or the change of the internal policy according to the request of the host 100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 100, the internal policy of the storage device 200, or the change of the internal policy according to a request of the host 100.

In exemplary embodiments, the storage device 200 may perform a flush operation during the idle state or the hibernation state. In this case, the storage device 200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In exemplary embodiments, the storage device 200, in response to a size of a valid region to store data, of the non-pinned turbo write buffer TWB-np being smaller than a size of the data to be written, may migrate a data that is pre-stored in the non-pinned turbo write buffer TWB-np to the user storage UST by performing the above-described read-correction-transfer operation a plurality of times using the internal buffer 380.

In this case, the user data written in the pinned turbo write buffer TWB-p may not be flushed to the user storage UST. In other words, even though the storage device 200 performs the flush operation, the user data written in the pinned turbo write buffer TWB-p may be maintained.

As another example, depending on the internal policy of the storage device 200, data to be stored in the non-pinned turbo write buffer TWB-np may be written in the pinned turbo write buffer TWB-p. This data may be flushed from the pinned turbo write buffer TWB-p to the user storage UST. Accordingly, in the case where the host 100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme. In other words, as particular user data are retained in the pinned turbo write buffer TWB-p, a speed at which the particular user data are read may be improved. This function of the storage device 1200 may be called "turbo read".

FIGS. 16 through 20, assumes that the storage device 200 in FIG. 1 or the storage device 200a of FIG. 4A is a UFS device.

Figure 21:
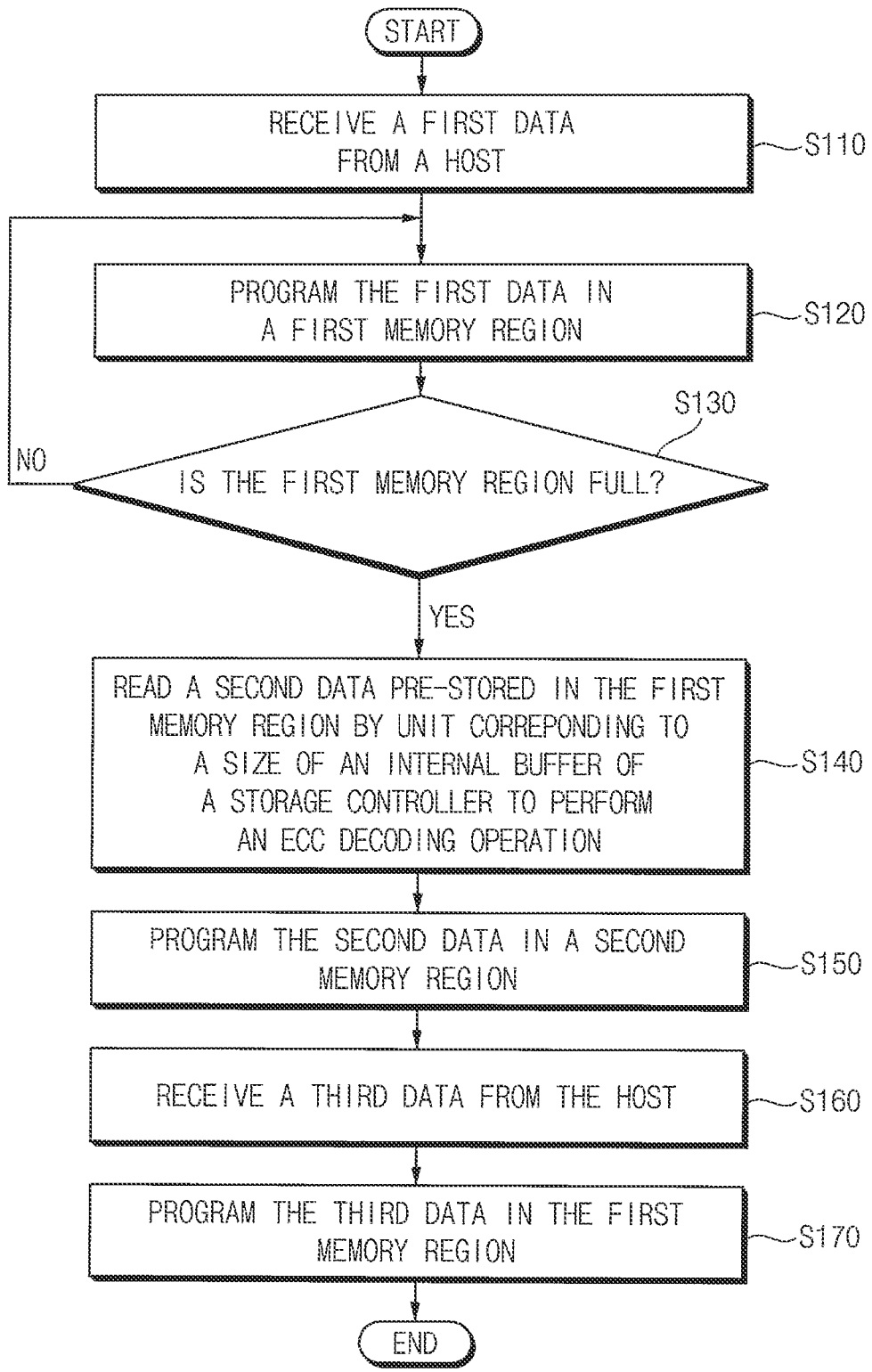
FIG. 21 is a flow chart illustrating a method of operating a storage device according to exemplary embodiments.

FIG. 21 is a flow chart illustrating a method of operating a storage device according to exemplary embodiments.

Referring to FIGS. 3 through 15 and 21, there is provide a method of operating a storage device 200a which includes a nonvolatile memory device 400a including a first memory region 421 having a first write speed and a second memory region 423 having a second write speed different from the first write speed and a storage controller 300 including an internal buffer 380 and controlling the nonvolatile memory device 400a.

According to the method, the storage controller 300 receives a first data from an external host 100 (operation S110). The storage controller 300 programs the first data in the first memory region 421 in a first mode (operation S120). The storage controller 300 determines whether the first memory region 421 is full (operation S130). That is, the storage controller 300 determines whether a size of a valid region to store data, of the first memory region 421 is smaller than a size of the first data.

When the memory region 421 is not full (NO in S130), the storage controller 300 programs the first data in the first memory region 421 (operation S120).

When the memory region 421 is full (YES in S130), the storage controller 300 performs read operation-transfer operation to read a second data that is pre-stored in the first memory region 421 by a first unit and to transfer the first unit of data to a data circuit 440 of the nonvolatile memory device 400a a plurality of times (operation S140).

The nonvolatile memory device 400a programs the second data in the second memory region 423 (operation S150). The storage controller 300 receives a third data from the host 100 (operation S160). The storage controller 300 programs the third data in the first memory region 421 in the first mode (operation S170).

Therefore, in the storage device and the method of operating a storage device according to exemplary embodiments, when the storage controller is to program a first data in a first memory region having a higher write speed, the storage controller performs a data migration operation to move sequentially a second data that is pre-stored in the first memory region to an internal buffer of the storage controller and to program the second data in a second memory region having a slower write speed. Therefore, it is possible that data capacity of the internal buffer is smaller than data storage capacity of the first memory region and thus size of the storage controller may be reduced by reducing a size of the internal buffer.

Figure 22:
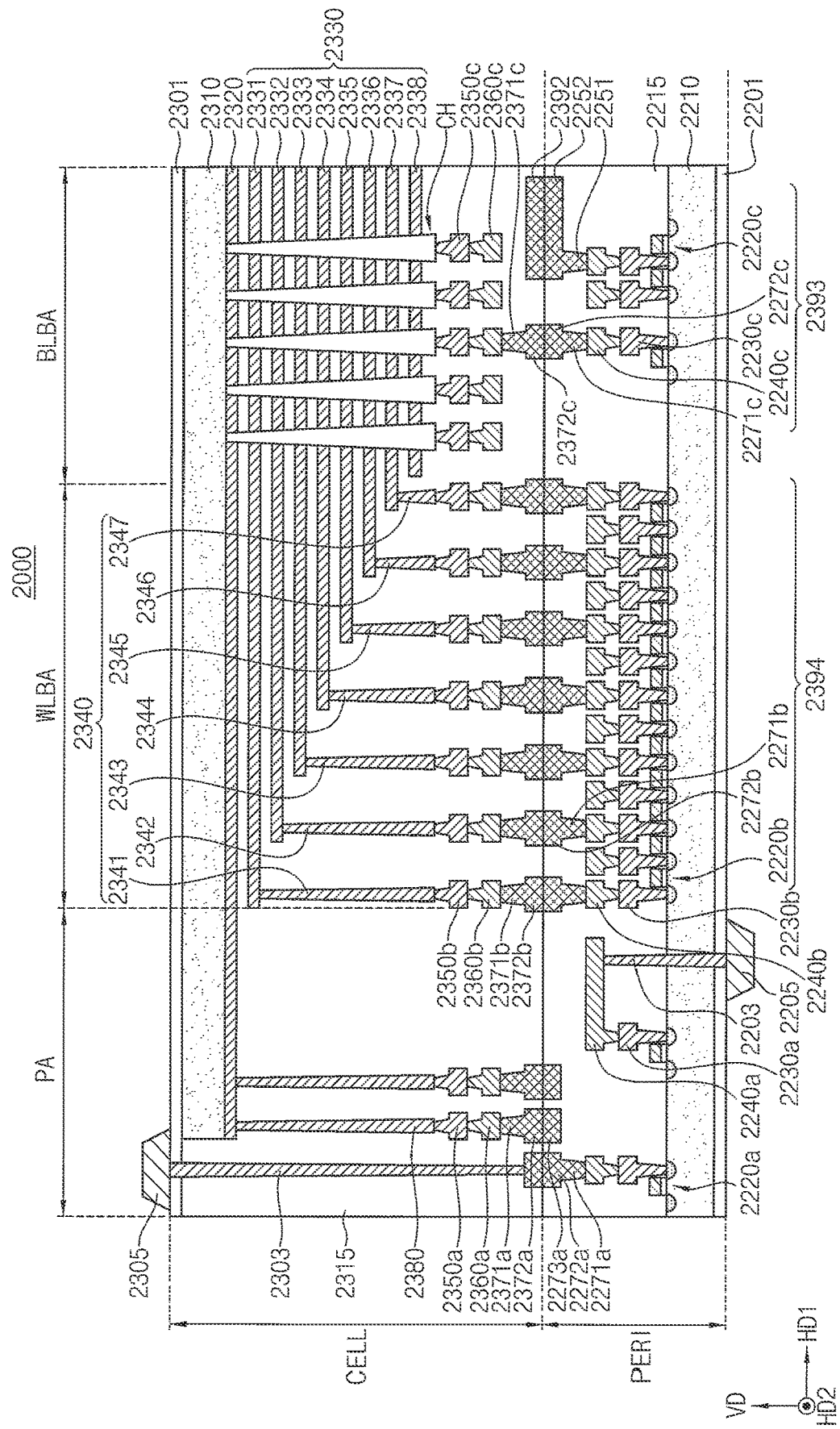
FIG. 22 is a cross-sectional view of a nonvolatile memory device according to exemplary embodiments.

FIG. 22 is a cross-sectional view of a nonvolatile memory device according to exemplary embodiments.

Referring to FIG. 22, a nonvolatile memory device 2000 may have a chip-to-chip (C2C) structure. The C2C structure may refer to a structure formed by manufacturing an upper chip including a memory cell region or a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The exemplary embodiments, however, may not be limited thereto. For example, the bonding metals may also be formed of aluminum (Al) or tungsten (W).

Each of the peripheral circuit region PERI and the cell region CELL of the nonvolatile memory device 2000 may include an external pad bonding area PA, a word-line bonding area WLBA, and a bit-line bonding area BLBA.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In an example exemplary, the first metal layers 2230a, 2230b, and 2230c may be formed of tungsten having relatively high electrical resistivity, and the second metal layers 2240a, 2240b, and 2240c may be formed of copper having relatively low electrical resistivity.

In an exemplary embodiment illustrated in FIG. 22, although only the first metal layers 2230a, 2230b, and 2230c and the second metal layers 2240a, 2240b, and 2240c are shown and described, the exemplary embodiment is not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of aluminum or the like having a lower electrical resistivity than those of copper forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the word-line bonding area WLBA. In the word-line bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may be formed of aluminum, copper, tungsten, or the like. Further, the upper bonding metals 2371b and 2372b in the cell region CELL may be referred as first metal pads and the lower bonding metals 2271b and 2272b in the peripheral circuit region PERI may be referred as second metal pads.

The cell region CELL may include at least one memory block. The cell region CELL may include a second substrate 2310 and a common source line 2320. On the second substrate 2310, a plurality of word-lines 2331, 2332, 2333, 2334, 2335, 2336, 2337, and 2338 (i.e., 2330) may be stacked in a vertical direction VD (e.g., a Z-axis direction), perpendicular to an upper surface of the second substrate 2310. At least one string selection line and at least one ground selection line may be arranged on and below the plurality of word-lines 2330, respectively, and the plurality of word-lines 2330 may be disposed between the at least one string selection line and the at least one ground selection line.

In the bit-line bonding area BLBA, a channel structure CH may extend in the vertical direction VD, perpendicular to the upper surface of the second substrate 2310, and pass through the plurality of word-lines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bit-line contact, and the second metal layer 2360c may be a bit-line. In an exemplary embodiment, the bit-line 2360c may extend in a second horizontal direction HD2 (e.g., a Y-axis direction), parallel to the upper surface of the second substrate 2310.

In an exemplary embodiment illustrated in FIG. 22, an area in which the channel structure CH, the bit-line 2360c, and the like are disposed may be defined as the bit-line bonding area BLBA. In the bit-line bonding area BLBA, the bit-line 2360c may be electrically connected to the circuit elements 2220c providing a page buffer 2393 in the peripheral circuit region PERI. The bit-line 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2393.

In the word-line bonding area WLBA, the plurality of word-lines 2330 may extend in a first horizontal direction HD1 (e.g., an X-axis direction), parallel to the upper surface of the second substrate 2310 and perpendicular to the second horizontal direction HD2, and may be connected to a plurality of cell contact plugs 2341, 2342, 2343, 2344, 2345, 2346, and 2347 (i.e., 2340). The plurality of word-lines 2330 and the plurality of cell contact plugs 2340 may be connected to each other in pads provided by at least a portion of the plurality of word-lines 2330 extending in different lengths in the first horizontal direction HD1. A first metal layer 2350b and a second metal layer 2360b may be connected to an upper portion of the plurality of cell contact plugs 2340 connected to the plurality of word-lines 2330, sequentially. The plurality of cell contact plugs 2340 may be connected to the peripheral circuit region PERI by the upper bonding metals 2371b and 2372b of the cell region CELL and the lower bonding metals 2271b and 2272b of the peripheral circuit region PERI in the word-line bonding area WLBA.

The plurality of cell contact plugs 2340 may be electrically connected to the circuit elements 2220b forming a row decoder 2394 in the peripheral circuit region PERI. In an exemplary embodiment, operating voltages of the circuit elements 2220b forming the row decoder 2394 may be different than operating voltages of the circuit elements 2220c forming the page buffer 2393. For example, operating voltages of the circuit elements 2220c forming the page buffer 2393 may be greater than operating voltages of the circuit elements 2220*b* forming the row decoder 2394.

A common source line contact plug 2380 may be disposed in the external pad bonding area PA. The common source line contact plug 2380 may be formed of a conductive material such as a metal, a metal compound, polysilicon, or the like, and may be electrically connected to the common source line 2320. A first metal layer 2350*a* and a second metal layer 2360*a* may be stacked on an upper portion of the common source line contact plug 2380, sequentially. For example, an area in which the common source line contact plug 2380, the first metal layer 2350*a*, and the second metal layer 2360*a* are disposed, may be defined as the external pad bonding area PA.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220*a*, 2220*b*, and 2220*c* disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310 and a second input/output pad 2305 may be disposed on the upper insulating layer 2301. The second input/output pad 2305 may be connected to at least one of the plurality of circuit elements 2220*a*, 2220*b*, and 2220*c* disposed in the peripheral circuit region PERI through a second input/output contact plug 2303 and/or lower bonding metals 2271*a* and 2272*a*, and the like. In the exemplary embodiment, the second input/output pad 2305 is electrically connected to a circuit element 2220*a*.

According to exemplary embodiments, the second substrate 2310 and the common source line 2320 may not be disposed in an area in which the second input/output contact plug 2303 is disposed. Also, the second input/output pad 2305 may not overlap the word-lines 2330 in the vertical direction VD. The second input/output contact plug 2303 may be separated from the second substrate 2310 in the direction, parallel to the upper surface of the second substrate 310, and may pass through the interlayer insulating layer 2315 of the cell region CELL to be connected to the second input/output pad 2305.

According to further exemplary embodiments, the first input/output pad 2205 and the second input/output pad 2305 may be selectively formed. For example, the nonvolatile memory device 2000 may include only the first input/output pad 2205 disposed on the first substrate 2210 or the second input/output pad 2305 disposed on the second substrate 2310. Alternatively, the memory device 200 may include both the first input/output pad 2205 and the second input/output pad 2305.

A metal pattern provided in an uppermost metal layer may be provided as a dummy pattern or the uppermost metal layer may be absent, in each of the external pad bonding area PA and the bit-line bonding area BLBA, respectively included in the cell region CELL and the peripheral circuit region PERI.

In the external pad bonding area PA, the nonvolatile memory device 2000 may include a lower metal pattern 2273*a*, corresponding to an upper metal pattern 2372*a* formed in an uppermost metal layer of the cell region CELL, and having the same cross-sectional shape as the upper metal pattern 2372*a* of the cell region CELL so as to be connected to each other, in an uppermost metal layer of the peripheral circuit region PERI. In the peripheral circuit region PERI, the lower metal pattern 2273*a* formed in the uppermost metal layer of the peripheral circuit region PERI may not be connected to a contact. Similarly, in the external pad bonding area PA, an upper metal pattern 2372*a*, corresponding to the lower metal pattern 2273*a* formed in an uppermost metal layer of the peripheral circuit region PERI, and having the same shape as a lower metal pattern 2273*a* of the peripheral circuit region PERI, may be formed in an uppermost metal layer of the cell region CELL. The upper metal pattern 2372*a* may be included in upper bonding metals 2371*a* and 2372*a*.

The lower bonding metals 2271*b* and 2272*b* may be formed on the second metal layer 2240*b* in the word-line bonding area WLBA. In the word-line bonding area WLBA, the lower bonding metals 2271*b* and 2272*b* of the peripheral circuit region PERI may be electrically connected to the upper bonding metals 2371*b* and 2372*b* of the cell region CELL by a Cu-to-Cu bonding.

Further, in the bit-line bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact may be omitted on the upper metal pattern 2392 formed in the uppermost metal layer of the cell region CELL. The lower metal pattern 2252 may be included in lower bonding metals 2251 and 2252.

In an exemplary embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

The word-line voltages may be applied to at least one memory block in the cell region CELL through the lower bonding metals 2271*b* and 2272*b* in the peripheral circuit region PERI and upper bonding metals 2371*b* and 2372*b* of the cell region CELL.

A page buffer circuit including the page buffer PB of FIG. 8 may be provided in the peripheral circuit region PERI using at least a portion of the plurality of circuit elements 2220*a*, 2220*b* and 2220*c*.

Figure 23:
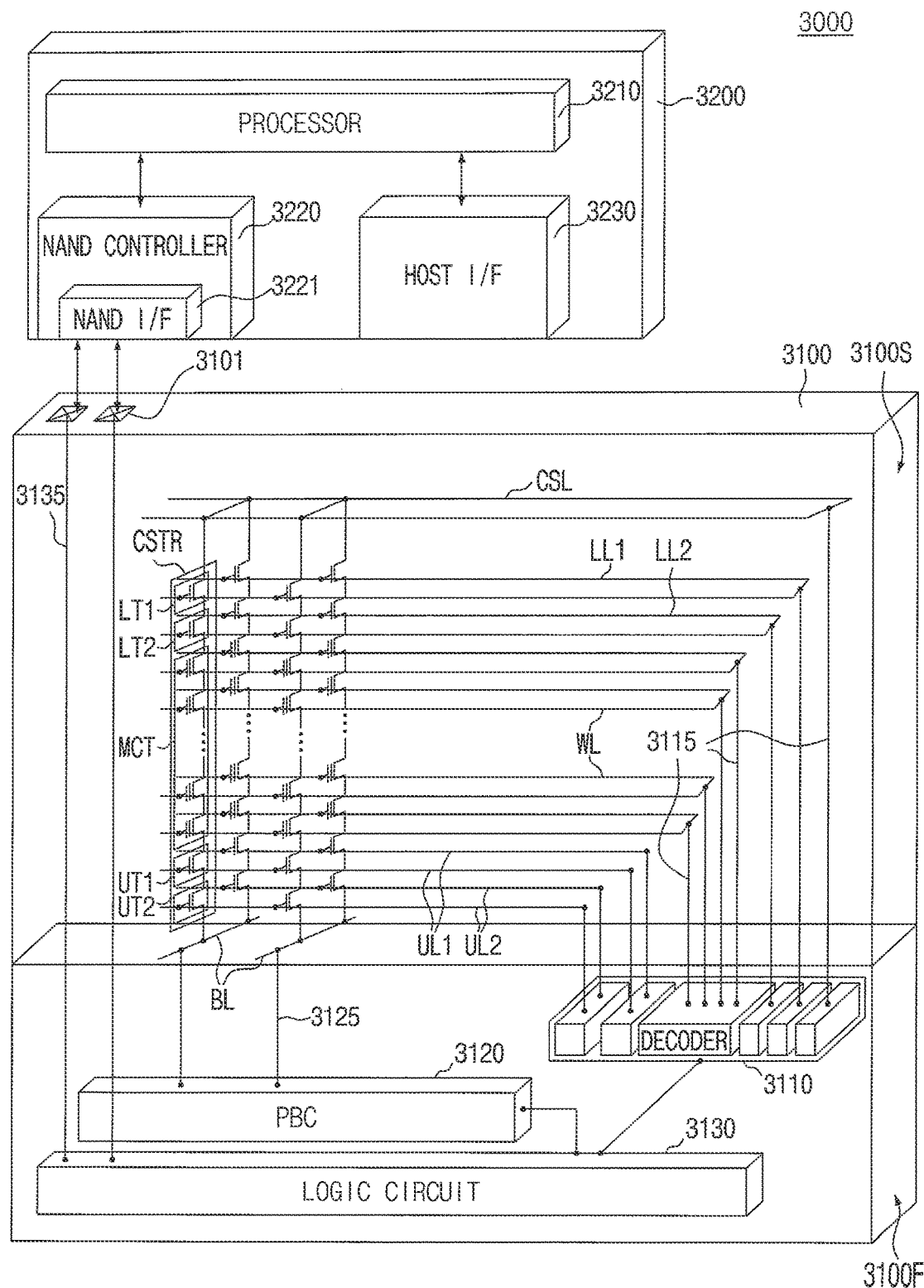
FIG. 23 is a block diagram illustrating an electronic system including a semiconductor device according to exemplary embodiments.

FIG. 23 is a block diagram illustrating an electronic system including a semiconductor device according to exemplary embodiments.

Referring to FIG. 23, an electronic system 3000 may include a semiconductor device 3100 and a controller 3200 electrically connected to the semiconductor device 3100. The electronic system 3000 may be a storage device including one or a plurality of semiconductor devices 3100 or an electronic device including a storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a nonvolatile memory device, for example, a nonvolatile memory device that will be illustrated with reference to FIGS. 5 through 11.

The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and memory cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with exemplary embodiments.

In exemplary embodiments, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In exemplary embodiments, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

Figure 24:
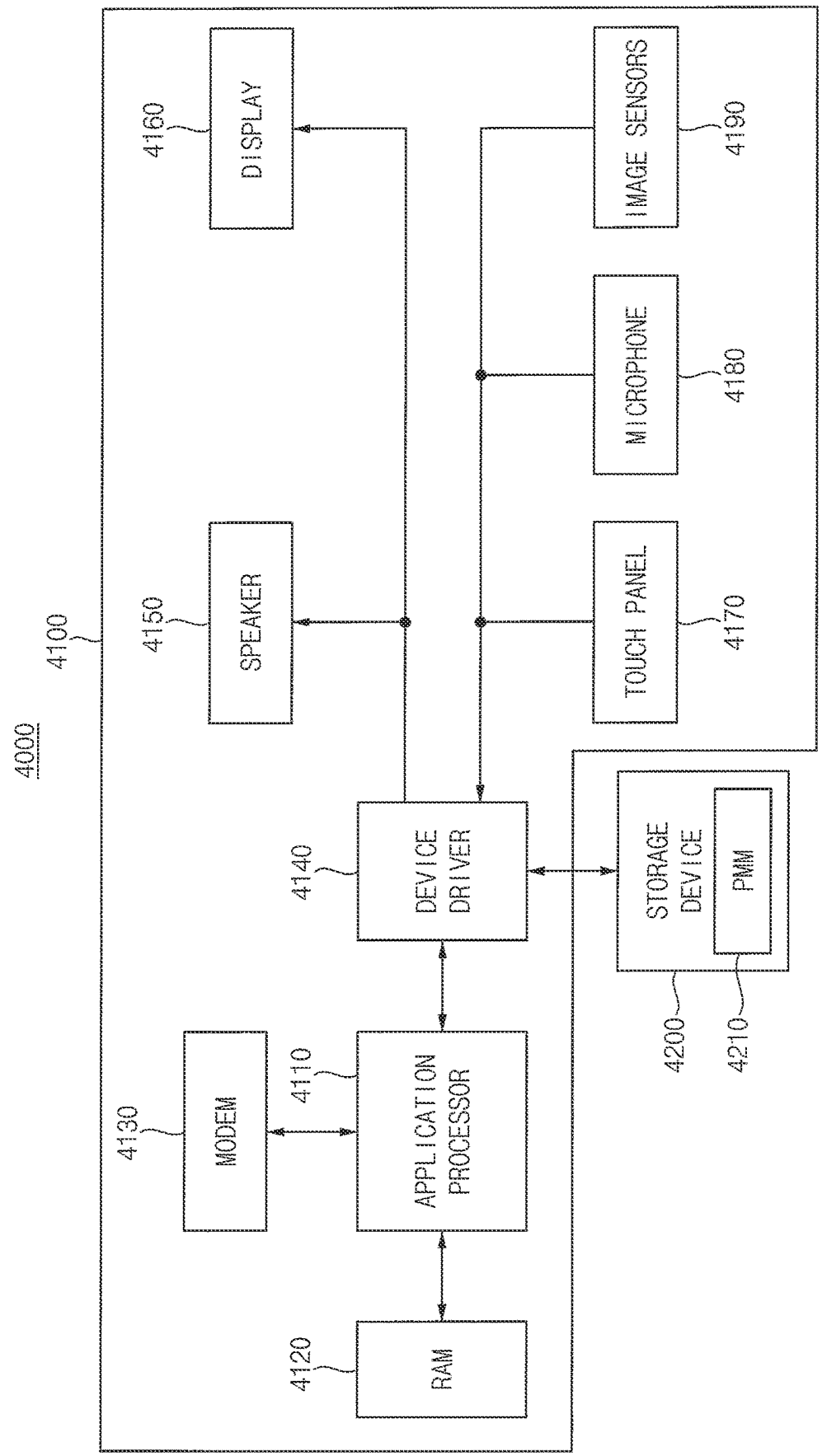
FIG. 24 is a block diagram illustrating a storage system according to exemplary embodiments.

FIG. 24 is a block diagram illustrating a storage system according to exemplary embodiments.

Referring to FIG. 24, a storage system 4000 may include a host 4100 and a storage device 4200. The storage device 4200 may include a program/migration manager PMM 4210. The host 4100 and the storage device 4200 may operate as described with reference to FIGS. 1 to 20.

The host 4100 may include an application processor 4110, a random access memory (RAM) 4120, a modem 4130, a device driver 4140, a speaker 4150, a display 4160, a touch panel 4170, a microphone 4180, and image sensors 4190.

The application processor 4110 may execute an application and a file system. The application processor 4110 may use the RAM 4120 as a system memory. The application processor 4110 may communicate with an external device through the modem 4130 in a wired fashion or wirelessly. For example, the modem 4130 may be embedded in the application processor 4110.

The application processor 4110 may communicate with peripheral devices through the device driver 4140. For example, the application processor 4110 may communicate with the speaker 4150, the display 4160, the touch panel 4170, the microphone 4180, the image sensors 4190, and the storage device 4200 through the device driver 4140.

The speaker 4150 and the display 4160 may be user output interfaces that transfer information to a user. The touch panel 4170, the microphone 4180, and the image sensors 4190 may be user input interfaces that receive information from the user.

Figure 25:
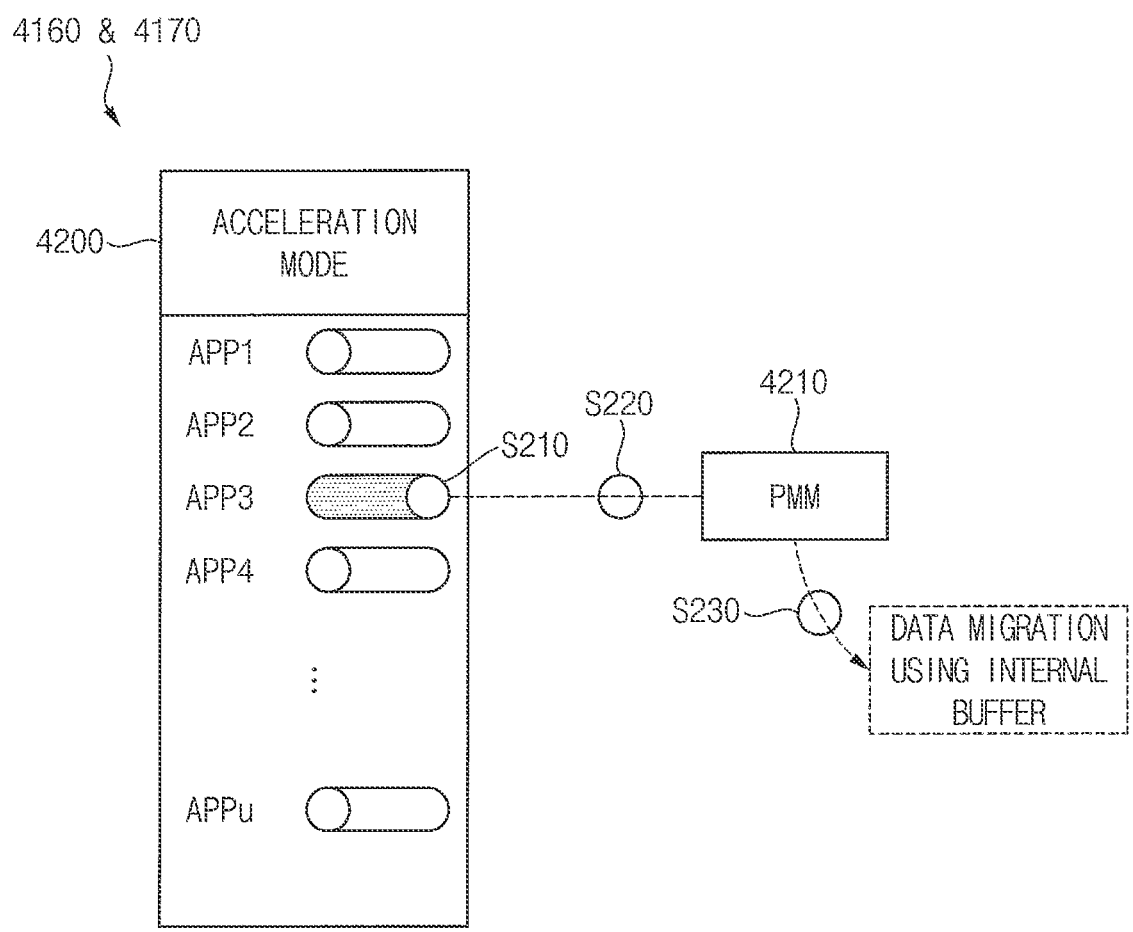
FIG. 25 illustrates a diagram in which an exemplary embodiment is applied to the storage system of FIG. 24.

FIG. 25 illustrates a diagram in which an exemplary embodiment is applied to the storage system of FIG. 24.

Referring to FIGS. 24 and 25, the storage system 1000 may provide setting screens through the display 4160. One of the setting screens may provide information of an acceleration mode to the user.

The storage system 4000 may display a list of first to u-th applications APP1 to APPu, to which the acceleration modes are applicable, through the display 4160. In addition, the storage system 4000 may display, through the display 4160, switches that allow the user to adjust the acceleration modes of the first to u-th applications APP1 to APPu. Here, u is a natural number greater than four.

In operation S210, the user may touch an enable location of the acceleration mode of the third application APP3. The storage system 4000 may sense a touch of the user, in other words, the directions activating the third application APP3 through the touch panel 4170. In operation S220, information of the third application APP3 or processes of the third application APP3 may be transferred to the program/migration manager 4210.

As the information of the third application APP3 or the processes of the third application APP3 are received, in operation S230, the program/migration manager 4210 may reserve a data migration operation of a subsequent write of the third application APP3 or the processes thus selected. For example, the program/migration manager 4210 may store the data associated with the third application APP3 or processes of the third application APP3 in a first memory region by performing the data migration operation using internal buffer on the data associated with the third application APP3 or processes of the third application APP3.

A nonvolatile memory device or a storage device according to exemplary embodiments may be packaged using various package types or package configurations.

The present disclosure may be applied to various electronic devices including a storage device. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of exemplary embodiments and is not to be construed as limiting thereof. Although a few exemplary embodiments have been described, those skilled in the art will readily appreciate that many modifications and variations are possible in the exemplary embodiments without materially departing from the novel teachings and advantages of the present disclosure. Accordingly, all such modifications and variations are intended to be included within the scope of the present disclosure as defined in the appended claims.

What is claimed is:

1. A storage device comprising:
   a nonvolatile memory device including a first memory region having a first write speed and a second memory region having a second write speed different from the first write speed; and
   a storage controller including an internal buffer, the storage controller configured to store data from an external host in the first memory region by priority in a first mode,
   wherein the storage controller is configured to control a data migration operation by:
   performing read operation-transfer operation to read a second data that is pre-stored in the first memory region by a first unit and to transfer the first unit of data to a data input/output (I/O) circuit of the nonvolatile memory device a plurality of times; and
   storing the second data transferred to the data I/O circuit in the second memory region.

2. The storage device of claim 1, wherein the first unit corresponds to a data storage capacity of the internal buffer,
   wherein, in response to a size of a valid region to store data, of the first memory region being smaller than a size of the first data, the storage controller is configured to:
   perform a correction operation to correct an error of the first unit of data a plurality of times; and
   perform the read operation and the transfer operation in parallel, and
   wherein the second write speed is slower than the first write speed.

3. The storage device of claim 1, wherein:
   each of first memory cells in the first memory region is configured to store N-bit data,
   each of second memory cells in the second memory region is configured to store M-bit data, and
   M and N are natural numbers and M is greater than N.

4. The storage device of claim 1,
   wherein the first memory region is a single level cell region and the second memory region is a triple level cell region,
   wherein the storage controller is configured to perform the read operation-transfer operation on the second data three times, and
   the first unit corresponds to a page unit of the first memory region and the second memory region.

5. The storage device of claim 1, wherein the storage controller further includes:
   a processor configured to determine a write mode associated with the first data as one of the first mode and a second mode to store the first data in the second memory region based on a write request associated with the first data; and
   a program/migration manager configured to control a program operation and the data migration operation under control of the processor.

6. The storage device of claim 5, wherein the storage controller further includes:
   an error correction code (ECC) engine configured to correct an error in the first unit of data by performing an ECC decoding operation on the first unit of data.

7. The storage device of claim 6,
   wherein the first unit of data includes a user data portion and a parity data portion, and
   wherein the ECC engine is configured to correct the error based on the parity data portion.

8. The storage device of claim 5, wherein the storage controller further includes:
   an on-chip memory onto which the program/migration manager is loaded, and
   wherein the processor is configured to execute the program/migration manager loaded onto the on-chip memory.

9. The storage device claim 5, wherein the processor is configured to:
   determine whether a current write request from the external host is consecutive with respect to a previous write request based on an idle time; and
   determine the write mode as one of the first mode and the second mode based on a result of the determination associated with the consecutiveness.

10. The storage device of claim 9,
    wherein the idle time corresponds to a time interval between the current write request and the previous write request received prior to the current write request, and
    wherein the processor is configured to:
    compare the idle time with a reference time interval;
    determine that the current write request is consecutive in response to the idle time being smaller than the reference time interval, and
    determine that the current write request is inconsecutive in response to the idle time being equal to or greater than the reference time interval.

11. The storage device of claim 10, wherein the processor is configured to:
    perform a write operation on the current write request based on the first mode in response to determining that the current write request is consecutive; and
    perform a write operation on the current write request based on the second mode in response to determining that the current write request is inconsecutive.

12. The storage device of claim 5, wherein the processor is configured to determine the write mode as one of the first mode and the second mode based on a size of the first data.

13. The storage device of claim 12, wherein processor is configured to:
store the first data in the first memory region in response to the size of the first data being equal to or greater than a reference size; and
store the first data in the second memory region in response to the size of the first data being smaller than the reference size.

14. The storage device of claim 5, wherein the processor is configured to determine the write mode as one of the first mode and the second mode based on a status information of the first memory region and the second memory region.

15. The storage device of claim 14, wherein the status information includes at least one of:
program/erase cycle information of the first memory region and the second memory region;
a number of free blocks in the first memory region and the second memory region; and
data retention time information of the first memory region and the second memory region.

16. The storage device of claim 1, wherein the nonvolatile memory device includes:
a memory cell array including the first memory region and the second memory region;
a voltage generator configured to generate word-line voltages based on control signals;
an address decoder coupled to the memory cell array through a plurality of word-lines, the address decoder configured to transfer the word-line voltages to the memory cell array based on a row address;
a page buffer circuit coupled to the memory cell array through a plurality of bit-lines; and
a control circuit configured to control the page buffer circuit, the address decoder and the voltage generator from a command and an address from the storage controller,
wherein the memory cell array includes the plurality of memory blocks, and
wherein at least one of the plurality of memory blocks includes a plurality of NAND strings, and each of the plurality of NAND strings includes a plurality of memory cells stacked in the vertical direction.

17. The storage device 16, wherein the memory cell array includes:
the plurality of word-lines stacked on a substrate;
a plurality of memory cells provided in a plurality of channel holes extending in a vertical direction with respect to the substrate; and
a word-line cut region extending in a first horizontal direction and dividing the plurality of word-lines into the plurality of memory blocks.

18. A method of operating a storage device, wherein the storage device includes a nonvolatile memory device including a first memory region having a first write speed and a second memory region having a second write speed different from the first write speed and a storage controller including an internal buffer and configured to control the nonvolatile memory device, the method comprising:
receiving, by the storage controller, a first data from an external host;
programing, by the storage controller, the first data in the first memory region in a first mode;
performing, by the storage controller, read operation-transfer operation to read a second data that is pre-stored in the first memory region by a first unit and to transfer the first unit of data to a data input/output (I/O) circuit of the nonvolatile memory device a plurality of times;
programming, by the nonvolatile memory device, the second data transferred to the data I/O circuit in the second memory region.

19. The method of claim 18, wherein the first unit corresponds to a data storage capacity of the internal buffer,
wherein, in response to the first memory region being full in the first mode, the storage controller is configured to perform a correction operation to correct an error of the first unit of data a plurality of times,
wherein the second write speed is slower than the first write speed,
wherein the first memory region is a single level cell region and the second memory region is a triple level cell region, and
wherein the storage controller is configured to perform the read operation-transfer operation on the second data three times.

20. A storage device comprising:
a nonvolatile memory device including a first memory region having a first write speed and a second memory region having a second write speed different from the first write speed; and
a storage controller including an internal buffer, the storage controller configured to store data from an external host in the first memory region by priority in a first mode,
wherein the storage controller is configured to control a data migration operation by:
reading a second data stored in the first memory region by a first unit of data;
performing read-transfer operation to transfer the first unit of data to a data input/output (I/O) circuit of the nonvolatile memory device a plurality of times; and
storing the second data transferred to the data I/O circuit in the second memory region,
wherein the storage controller further includes:
a processor configured to determine a write mode associated with the first data as one of the first mode and a second mode to store the first data in the second memory region based on a write request associated with the first data;
a program/migration manager configured to control a program operation and the data migration operation under control of the processor; and
an error correction code (ECC) engine configured to correct an error in the first unit of data by performing an ECC decoding operation on the first unit of data.

* * * * *